US012254113B2

(12) United States Patent
Schroeder et al.

(10) Patent No.: US 12,254,113 B2
(45) Date of Patent: Mar. 18, 2025

(54) MULTI-CAMERA VISION SYSTEM FACILITATING AUTHENTICATION AND SECURE DATA TRANSFER

(71) Applicant: Haier US Appliance Solutions, Inc., Wilmington, DE (US)

(72) Inventors: Michael Goodman Schroeder, Crestwood, KY (US); Anthony Michael King, Lexington, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 201 days.

(21) Appl. No.: 17/958,988

(22) Filed: Oct. 3, 2022

(65) Prior Publication Data

US 2024/0111897 A1 Apr. 4, 2024

(51) Int. Cl.
*G06F 21/00* (2013.01)
*G06F 21/62* (2013.01)
*H04L 9/40* (2022.01)
*H04W 12/06* (2021.01)

(52) U.S. Cl.
CPC ...... *G06F 21/6254* (2013.01); *G06F 21/6263* (2013.01); *H04L 63/0876* (2013.01); *H04W 12/06* (2013.01)

(58) Field of Classification Search
CPC ............ G06F 21/6254; G06F 21/6263; H04L 63/0876
See application file for complete search history.

(56) References Cited

U.S. PATENT DOCUMENTS

| 8,947,547 B1* | 2/2015 | Millikan | H04N 23/00 348/211.8 |
| 11,143,450 B2 | 10/2021 | Sumihiro et al. | |
| 2018/0187969 A1* | 7/2018 | Kim | G06F 3/04883 |
| 2018/0343379 A1* | 11/2018 | Suwa | G08B 13/19658 |

FOREIGN PATENT DOCUMENTS

| CN | 204301401 U | 4/2015 |
| CN | 113468937 A | 10/2021 |
| WO | WO2020111961 A1 | 6/2020 |

* cited by examiner

*Primary Examiner* — Jeffrey C Pwu
*Assistant Examiner* — Thong P Truong
(74) *Attorney, Agent, or Firm* — Dority & Manning, P.A.

(57) ABSTRACT

In one embodiment, a refrigerator appliance is provided. The refrigerator appliance can include a cabinet defining a chilled chamber, a controller configured to operate one or more components of the refrigerator appliance, and a camera assembly operable to monitor the chilled chamber. The camera assembly can include a camera module having a camera that is operable to capture data associated with the chilled chamber. The controller and the camera module can each be configured to respectively perform one or more operations of an authentication process to verify identity of the controller and the camera module. The camera module can be configured to operate the camera to capture the data associated with the chilled chamber and/or to transmit a redacted version of the data associated with the chilled chamber to the controller based at least in part on verification of the identity of the controller and the camera module.

19 Claims, 5 Drawing Sheets

MULTI-CAMERA VISION SYSTEM FACILITATING AUTHENTICATION AND SECURE DATA TRANSFER

FIELD

The present disclosure relates generally to refrigerator appliances, and more particularly to a multi-camera vision system facilitating authentication and secure data transfer in a refrigerator appliance and methods of operating the same.

BACKGROUND

Refrigerator appliances generally include a cabinet that defines a chilled chamber for receipt of food articles for storage. In addition, refrigerator appliances include one or more doors rotatably or slidably hinged to the cabinet to permit selective access to food items stored in chilled chamber(s). The refrigerator appliances can also include various storage components mounted within the chilled chamber and designed to facilitate storage of food items therein. Such storage components can include racks, bins, shelves, or drawers that receive food items and assist with organizing and arranging of such food items within the chilled chamber.

Notably, it is frequently desirable to have an updated inventory of items that are present within the refrigerator appliance, for example (e.g.), to facilitate reorders, to ensure food freshness or avoid spoilage, etcetera (etc.). Thus, it may be desirable to monitor food items that are added to or removed from refrigerator appliance and obtain other information related to the presence, quantity, or quality of such food items. Certain conventional refrigerator appliances have systems for monitoring food items in the refrigerator appliance. However, such systems often require user interaction, e.g., via direct input through a control panel as to the food items added or removed. By contrast, certain appliances include a camera for monitoring food items as they are added or removed from the refrigerator appliance.

A problem with certain camera systems used in a refrigerator appliance is that they may be complex and/or involve significant use of an appliance's resources such as, for example, the data processing, storage, and/or communication resources of a controller (e.g., a main control board) in the refrigerator appliance. Additionally, such camera systems may have components that are difficult to incorporate into the design, manufacturing, and/or assembly of a refrigerator appliance. Further, such camera systems may have components that involve significant costs associated with their production, operation (e.g., energy consumption costs), and/or maintenance.

Another problem with certain camera systems used in a refrigerator appliance is that the data (e.g., images, video, audio) transferred between the camera system and a controller in the refrigerator appliance can be intercepted and/or compromised, intentionally or unintentionally, by a device that is external to and/or not associated with the refrigerator appliance or a user (e.g., owner, operator) of the refrigerator appliance. Yet another problem with such camera systems used in a refrigerator appliance is that the data transferred between the camera system and the controller may contain sensitive information associated with, for instance, the user (e.g., owner, operator) of the refrigerator appliance.

BRIEF DESCRIPTION

Aspects and advantages of the present disclosure will be set forth in part in the following description, or can be learned from the description, or can be learned through practice of the embodiments.

In one example embodiment, a refrigerator appliance is provided. The refrigerator appliance can include a cabinet defining a chilled chamber. The refrigerator appliance can further include a controller coupled to the refrigerator appliance and configured to operate one or more components of the refrigerator appliance. The refrigerator appliance can further include a camera assembly coupled to the cabinet and operable to monitor the chilled chamber. The camera assembly can include a camera module having a camera that is operable to capture data associated with the chilled chamber. The controller and the camera module can each be configured to respectively perform one or more operations of an authentication process to verify identity of the controller and the camera module. The camera module can be configured to operate the camera to capture the data associated with the chilled chamber based at least in part on verification of the identity of the controller and the camera module.

In another example embodiment, a method of implementing inventory management within a refrigerator appliance is provided. The refrigerator appliance can include a chilled chamber, a controller, and a camera assembly including a camera module having a camera that is positioned to monitor the chilled chamber. The method can include performing, by the controller, one or more operations of an authentication process to confirm identity of the controller and the camera module. The method can further include operating, by the controller, the camera module to capture data associated with the chilled chamber based at least in part on a confirmation of the identity of the controller and the camera module.

In another example embodiment, a refrigerator appliance is provided. The refrigerator appliance can include a cabinet defining a chilled chamber. The refrigerator appliance can further include a controller coupled to the refrigerator appliance and configured to operate one or more components of the refrigerator appliance. The refrigerator appliance can further include a camera assembly coupled to the cabinet and operable to monitor the chilled chamber. The camera assembly can include a camera module having a camera that is operable to capture data associated with the chilled chamber. The controller and the camera module can each be configured to respectively perform one or more operations of an authentication process to verify identity of the controller and the camera module. The camera module can be configured to transmit a redacted version of the data associated with the chilled chamber to the controller based at least in part on a verification of the identity of the controller and the camera module.

These and other features, aspects, and advantages of various embodiments of the present disclosure will become better understood with reference to the following description and appended claims. The accompanying drawings, which are incorporated in and constitute a part of this specification, illustrate embodiments of the present disclosure and, together with the description, serve to explain the related principles of the present disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

Figure 1:
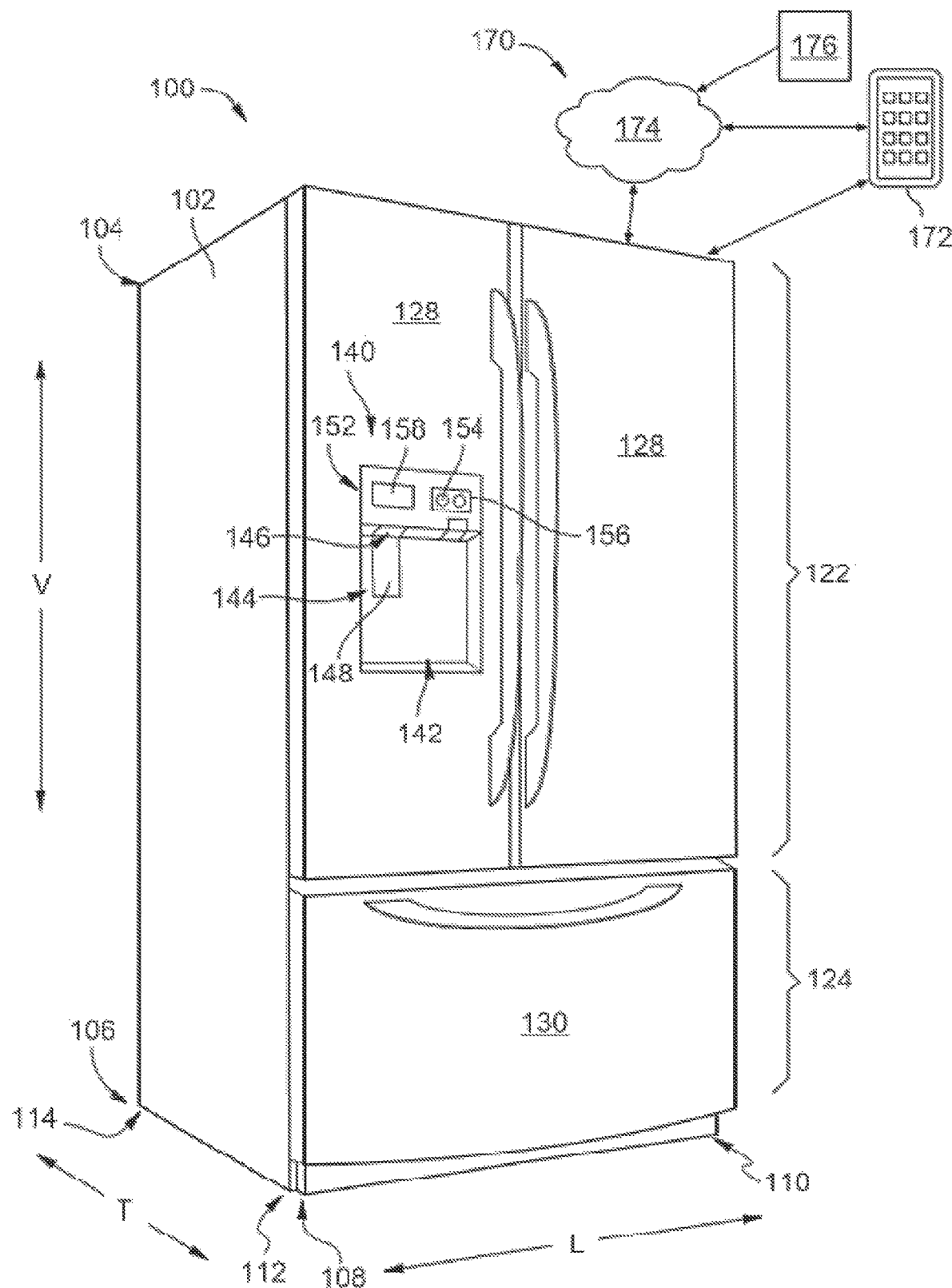
FIG. 1 illustrates a perspective view of an example, non-limiting refrigerator appliance according to one or more example embodiments of the present disclosure.

Repeat use of reference characters and/or numerals in the present specification and/or drawings is intended to represent the same or analogous features, elements, or operations of the present disclosure.

DETAILED DESCRIPTION

Reference now will be made in detail to embodiments of the present disclosure, one or more examples of which are illustrated in the drawings. Each example is provided by way of explanation of the present disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As referenced herein, the term "entity" refers to a human, a user, an end-user, a consumer, a computing device and/or program (e.g., a processor, computing hardware and/or software, an application, etc.), an agent, a machine learning (ML) and/or artificial intelligence (AI) algorithm, model, system, and/or application, and/or another type of entity that can implement and/or facilitate implementation of one or more embodiments of the present disclosure as described herein, illustrated in the accompanying drawings, and/or included in the appended claims. As used herein, the terms "couple," "couples," "coupled," and/or "coupling" refer to chemical coupling (e.g., chemical bonding), communicative coupling, electrical and/or electromagnetic coupling (e.g., capacitive coupling, inductive coupling, direct and/or connected coupling, etc.), mechanical coupling, operative coupling, optical coupling, and/or physical coupling.

As used herein, the terms "upstream" and "downstream" refer to the relative flow direction with respect to fluid flow in a fluid pathway. For example, "upstream" refers to the flow direction from which the fluid flows, and "downstream" refers to the flow direction to which the fluid flows. As referred to herein, the terms "includes" and "including" are intended to be inclusive in a manner similar to the term "comprising." As referenced herein, the terms "or" and "and/or" are generally intended to be inclusive, that is (i.e.), "A or B" or "A and/or B" are each intended to mean "A or B or both." As referred to herein, the terms "first," "second," "third," and so on, can be used interchangeably to distinguish one component or entity from another and are not intended to signify location, functionality, or importance of the individual components or entities.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language can correspond to the precision of an instrument for measuring the value. For example, the approximating language can refer to being within a 10 percent margin.

Referring now to the figures. Example refrigerator appliances, inventory management systems, camera assemblies, and corresponding methods of operation will be described in accordance with one or more embodiments of the present disclosure.

FIG. 1 illustrates a perspective view of an example, non-limiting refrigerator appliance 100 according to one or more example embodiments of the present disclosure. As illustrated, refrigerator appliance 100 generally defines a vertical direction V, a lateral direction L, and a transverse direction T, each of which is mutually perpendicular, such that an orthogonal coordinate system is generally defined.

According to example embodiments, refrigerator appliance 100 includes a cabinet 102 that is generally configured for containing and/or supporting various components of refrigerator appliance 100 and which can also define one or more internal chambers or compartments of refrigerator appliance 100. In this regard, as used herein, the terms "cabinet," "housing," and the like are generally intended to refer to an outer frame or support structure for refrigerator appliance 100, for example (e.g.), including any suitable number, type, and configuration of support structures formed from any suitable materials, such as a system of elongated support members, a plurality of interconnected panels, or some combination thereof. It should be appreciated that cabinet 102 does not necessarily require an enclosure and can simply include open structure supporting various elements of refrigerator appliance 100. By contrast, cabinet 102 can enclose some or all portions of an interior of cabinet 102. It should be appreciated that cabinet 102 can have any suitable size, shape, and configuration while remaining within the scope of the present disclosure.

As illustrated, cabinet 102 generally extends between a top 104 and a bottom 106 along the vertical direction V, between a first side 108 (e.g., the left side when viewed from the front as in FIG. 1) and a second side 110 (e.g., the right side when viewed from the front as in FIG. 1) along the lateral direction L, and between a front side 112 and a rear 114 along the transverse direction T. In general, terms such as "left," "right," "front," "rear," "top," or "bottom" are used with reference to the perspective of a user accessing refrigerator appliance 100.

Cabinet 102 defines chilled chambers for receipt of food items for storage. In particular, cabinet 102 defines fresh food chamber 122 positioned at or adjacent top 104 of cabinet 102 and a freezer chamber 124 arranged at or adjacent bottom 106 of cabinet 102. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance, a side-by-side style refrigerator appliance, or a single door refrigerator appliance. Moreover, aspects of the present disclosure can be applied to other appliances as well. Consequently, the description set forth herein is for illustrative purposes only and is not intended to be limiting in any aspect to any particular appliance or configuration.

Refrigerator doors 128 are rotatably hinged to an edge of cabinet 102 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. In general, refrigerator doors 128 form a seal over a front opening 132 (FIGS. 2 and 3) defined by cabinet 102 (e.g., extending within a plane defined by the vertical direction V and the lateral direction L). In this regard, a user can place items within fresh food chamber 122 through front opening 132 when refrigerator doors 128 are open and can then close refrigerator doors 128 to facilitate climate control. Refrigerator doors 128 and freezer door 130 are shown in the closed configuration in FIG. 1. One skilled in the art will appreciate that other chamber and door configurations are possible and within the scope of the present disclosure.

Figure 2:
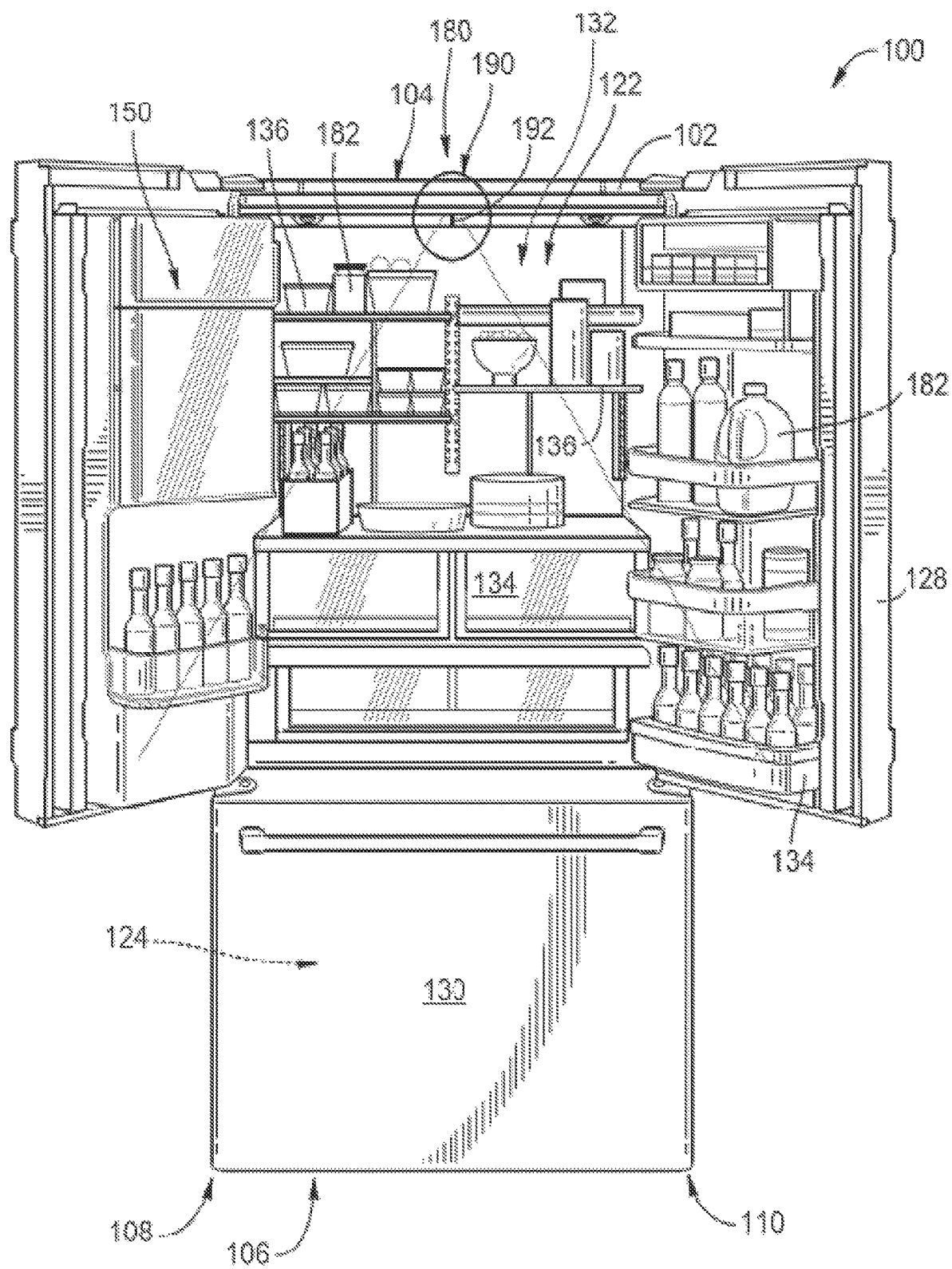
FIG. 2 illustrates a perspective view of the example, non-limiting refrigerator appliance of FIG. 1, with doors shown in an open position to reveal one or more components of the refrigerator appliance and/or objects therein according to one or more example embodiments of the present disclosure.

FIG. 2 illustrates a perspective view of refrigerator appliance 100, with refrigerator doors 128 shown in an open position to reveal one or more components of refrigerator appliance 100 and/or objects therein according to one or more example embodiments of the present disclosure. As shown in FIG. 2, various storage components are mounted within fresh food chamber 122 to facilitate storage of food items therein as will be understood by those skilled in the art. In particular, the storage components can include bins 134 and shelves 136. Each of these storage components are configured to receive one or more objects 182 (e.g., food items, beverages) and can assist with organizing such object(s) 182. As illustrated, bins 134 can be mounted on refrigerator doors 128 or can slide into a receiving space in fresh food chamber 122. It should be appreciated that the illustrated storage components are used only for the purpose of explanation and that other storage components can be used and can have different sizes, shapes, and configurations.

Referring again to FIG. 1, a dispensing assembly 140 will be described according to example embodiments of the present disclosure. Although several different example embodiments of dispensing assembly 140 will be illustrated and described, similar reference numerals can be used to refer to similar components and features. Dispensing assembly 140 is generally configured for dispensing liquid water and/or ice. Although an example dispensing assembly 140 is illustrated and described herein, it should be appreciated that variations and modifications can be made to dispensing assembly 140 while remaining within the present disclosure.

Dispensing assembly 140 and its various components can be positioned at least in part within a dispenser recess 142 defined on one of refrigerator doors 128. In this regard, dispenser recess 142 is defined on a front side 112 of refrigerator appliance 100 such that a user can operate dispensing assembly 140 without opening refrigerator door 128. In addition, dispenser recess 142 is positioned at a predetermined elevation convenient for a user to access ice and enabling the user to access ice without the need to bend-over. In the example embodiment, dispenser recess 142 is positioned at a level that approximates the chest level of a user.

Dispensing assembly 140 includes an ice or water dispenser 144 including a discharging outlet 146 for discharging ice from dispensing assembly 140. An actuating mechanism 148, shown as a paddle, is mounted below discharging outlet 146 for operating ice or water dispenser 144. In alternative example embodiments, any suitable actuating mechanism can be used to operate ice dispenser 144. For example, ice or water dispenser 144 can include a sensor (e.g., an ultrasonic sensor) or a button rather than the paddle. Discharging outlet 146 and actuating mechanism 148 are an external part of ice or water dispenser 144 and are mounted in dispenser recess 142. By contrast, refrigerator door 128 can define an icebox compartment 150 (FIG. 2) housing an icemaker and an ice storage bin (not shown) that are configured to supply ice to dispenser recess 142.

A control panel 152 is provided for controlling the mode of operation. For example, control panel 152 includes one or more selector inputs 154, such as knobs, buttons, touch-screen interfaces, etcetera (etc.), such as a water dispensing button and an ice-dispensing button, for selecting a desired mode of operation such as crushed or non-crushed ice. In addition, inputs 154 can be used to specify a fill volume or method of operating dispensing assembly 140. In this regard, inputs 154 can be in communication with a processing device or controller 156. Signals generated in controller 156 operate refrigerator appliance 100 and dispensing assembly 140 in response to selector input(s) 154. Additionally, a display 158, such as an indicator light or a screen, can be provided on control panel 152. Display 158 can be in communication with controller 156 and can display information in response to signals from controller 156.

Controller 156 can be mounted and/or coupled (e.g., electrically, communicatively, operatively, physically) to refrigerator appliance 100. For example, controller can be mounted and/or coupled (e.g., electrically, communicatively, operatively, physically) to cabinet 102, top 104, bottom 106, first side 108, second side 110, front side 112, rear 114, fresh food chamber 122, freezer chamber 124, refrigerator door 128, freezer door 130, control panel 152, and/or another portion of refrigerator appliance 100.

As used herein, "processing device" or "controller" can refer to one or more microprocessors or semiconductor devices and is not restricted necessarily to a single element. The processing device or controller (e.g., controller 156) can be programmed (e.g., provisioned, configured, operable) to operate refrigerator appliance 100, dispensing assembly 140, and one or more other components of refrigerator appliance 100. The processing device or controller (e.g., controller 156) can include, or be associated with, one or more memory elements (e.g., non-transitory storage media, non-transitory computer-readable storage media). In some embodiments, such memory element(s) include electrically erasable, programmable read only memory (EEPROM). Generally, the memory element(s) can store information accessible by a processing device or controller (e.g., controller 156), including instructions that can be executed by the processing device or controller. Optionally, the instructions can be software or any set of instructions and/or data that when executed by the processing device or controller (e.g., controller 156), cause the processing device to perform operations.

Referring still to FIG. 1, a schematic diagram of an external communication system 170 will be described according to an example embodiment of the present disclosure. In general, external communication system 170 is configured for permitting interaction, data transfer, and other communications between refrigerator appliance 100 and one or more external devices. For example, this communication can be used to provide and receive various types of data in various types of formats (e.g., data signals, media, images, video, audio, multiplexed or demultiplexed data signals), operating parameters, user instructions or notifications, performance characteristics, user preferences, or any other suitable information for improved performance of refrigerator appliance 100. In addition, it should be appreciated that external communication system 170 can be used to transfer data or other information to improve performance of one or more external devices or appliances and/or improve user interaction with such devices.

For example, external communication system 170 permits controller 156 of refrigerator appliance 100 to communicate with a separate device external to refrigerator appliance 100, referred to generally herein as an external device 172. As described in more detail below, these communications can be facilitated using a wired or wireless connection, such as via a network 174. In general, external device 172 can be any suitable device separate from refrigerator appliance 100 that is configured to provide and/or receive communications, information, data, or commands from a user. In this regard, external device 172 can be, for example, a personal phone, a smartphone, a tablet, a laptop or personal computer, a wearable device, a smart home system, or another mobile or remote device.

In addition, a remote server 176 can be in communication with refrigerator appliance 100 and/or external device 172 through network 174. In this regard, for example, remote server 176 can be a cloud-based server, and is thus located at a distant location, such as in a separate state, country, etc. According to an example embodiment, external device 172 can communicate with a remote server 176 over network 174, such as the Internet, to transmit and/or receive data or information, provide user inputs, receive user notifications or instructions, interact with or control refrigerator appliance 100, etc. In addition, external device 172 and remote server 176 can communicate with refrigerator appliance 100 to communicate similar information. According to example embodiments, remote server 176 can be configured to receive and analyze images, video, audio, and/or other data obtained by a camera assembly 190 (FIGS. 2 and 3) of refrigerator appliance 100, e.g., to facilitate inventory analysis.

In general, communication between refrigerator appliance 100, external device 172, remote server 176, and/or other user devices or appliances can be carried using any type of wired or wireless connection and using any suitable type of communication network, non-limiting examples of which are provided below. For example, external device 172 can be in direct or indirect communication with refrigerator appliance 100 through any suitable wired or wireless communication connections or interfaces, such as network 174. For example, network 174 can include one or more of a local area network (LAN), a wide area network (WAN), a personal area network (PAN), the Internet, a cellular network, any other suitable short-range or long-range wireless networks, etc. In addition, communications can be transmitted using any suitable communications devices or protocols, such as via Wi-Fi®, Bluetooth®, Zigbee®, wireless radio, laser, infrared, Ethernet type devices and interfaces, etc. In addition, such communication can use a variety of communication protocols (e.g., transmission control protocol/internet protocol (TCP/IP), hypertext transfer protocol (HTTP), simple mail transfer protocol (SMTP), file transfer protocol (FTP), etc.), encodings or formats (e.g., hypertext markup language (HTML), extensible markup language (XML), etc.), and/or protection schemes (e.g., virtual private network (VPN), secure HTTP, secure shell (SSH), secure sockets layer (SSL), etc.).

External communication system 170 is described herein according to an example embodiment of the present disclosure. However, it should be appreciated that the example functions and configurations of external communication system 170 provided herein are used only as examples to facilitate description of aspects of the present disclosure. System configurations can vary, other communication devices can be used to communicate directly or indirectly with one or more associated appliances, other communication protocols and steps can be implemented, etc. These variations and modifications are contemplated as within the scope of the present disclosure.

Referring now generally to FIG. 2, refrigerator appliance 100 can further include an inventory management system 180 that is generally configured to monitor one or more chambers of refrigerator appliance 100 to monitor the addition and/or removal of inventory. More specifically, as described in more detail below, inventory management system 180 can include a plurality of sensors, cameras, or other detection devices that are used to monitor fresh food chamber 122 and/or freezer chamber 124 to detect objects 182 (e.g., food items, beverages) that are positioned in or removed from fresh food chamber 122 and/or freezer chamber 124. In this regard, inventory management system 180 can use data from each of these devices to obtain a complete representation or knowledge of the identity, position, and/or other qualitative or quantitative characteristics of objects 182 within fresh food chamber 122 and/or freezer chamber 124. Although inventory management system 180 is described herein as monitoring fresh food chamber 122 for the detection of objects 182, it should be appreciated that aspects of the present disclosure can be used to monitor objects or items in any other suitable appliance, chamber (e.g., freezer chamber 124), etc.

As shown schematically in FIG. 2, inventory management system 180 can include a camera assembly 190 coupled to refrigerator appliance 100 (e.g., to cabinet 102) that is generally positioned and configured for obtaining images, video, and/or audio of refrigerator appliance 100 during operation. Specifically, according to the illustrated embodiment, camera assembly 190 includes one or more cameras 192 that are mounted to cabinet 102, to refrigerator doors 128, or are otherwise positioned in view of fresh food chamber 122. Although camera assembly 190 is described herein as being used to monitor fresh food chamber 122 of refrigerator appliance 100, it should be appreciated that aspects of the present disclosure can be used to monitor any other suitable regions of any other suitable appliance, e.g., such as freezer chamber 124. As best shown in FIG. 2, a camera 192 of camera assembly 190 is mounted to cabinet 102 at front opening 132 of fresh food chamber 122 and is oriented to have a field of view directed across front opening 132 and/or into fresh food chamber 122.

Although a single camera 192 is illustrated in FIG. 2, it should be appreciated that camera assembly 190 can include a plurality of cameras 192 positioned within and/or coupled (e.g., mounted) to cabinet 102, wherein each of the plurality of cameras 192 has a specified monitoring zone or monitoring range positioned around fresh food chamber 122. In this regard, for example, the field of view of each camera 192 can be limited to, directed to, or focused on a certain monitoring zone, monitoring range, or a specific area within fresh food chamber 122. Specifically, referring now briefly to FIG. 3, an illustration of a perspective view of refrigerator appliance 100 including an example, non-limiting inventory management system 180 having a plurality of cameras 192 according to one or more example embodiments of the present disclosure is provided. As shown, cameras 192 can be mounted to a sidewall of fresh food chamber 122 and can be spaced apart along the vertical direction V to cover different monitoring zones.

Notably, however, it can be desirable to position each camera 192 proximate front opening 132 of fresh food chamber 122 and orient each camera 192 such that the field of view of each camera 192 is directed into fresh food chamber 122. In this manner, privacy concerns related to obtaining images of the user of the refrigerator appliance 100 can be mitigated or avoided altogether. According to example embodiments, camera assembly 190 can be used to facilitate an inventory management process for refrigerator appliance 100. As such, each camera 192 can be positioned at an opening to fresh food chamber 122 to monitor objects 182 (e.g., food items, beverages) that are being added to or removed from fresh food chamber 122.

According to still other embodiments, each camera 192 can be oriented in any other suitable manner for monitoring any other suitable region within or around refrigerator appliance 100. It should be appreciated that according to alternative embodiments, camera assembly 190 can include any suitable number, type, size, and configuration of camera(s) 192 for obtaining images of any suitable areas or regions within or around refrigerator appliance 100. In addition, it should be appreciated that each camera 192 can include features for adjusting its field of view and/or orientation.

It should be appreciated that the images, video, and/or audio obtained by camera assembly 190 can vary in number, frequency, angle, resolution, detail, etc. in order to improve the clarity of the particular regions surrounding or within refrigerator appliance 100. In addition, according to example embodiments, controller 156 can be configured to illuminate the chilled chamber using one or more light sources prior to obtaining images. Notably, controller 156 of refrigerator appliance 100 (or any other suitable dedicated controller) can be communicatively coupled to camera assembly 190 and can be programmed or configured for analyzing the images obtained by camera assembly 190, e.g., in order to identify items being added or removed from refrigerator appliance 100, as described in detail below.

In general, controller 156 can be coupled (e.g., electrically, communicatively, operatively) to camera assembly 190 for analyzing one or more images, video, and/or audio obtained by camera assembly 190 to extract useful information regarding objects 182 located within fresh food chamber 122. In this regard, for example, images, video, and/or audio obtained by camera assembly 190 can be used to extract a barcode, identify a product, monitor the motion of the product, or obtain other product information related to object 182. Notably, this analysis can be performed locally (e.g., on controller 156) or can be transmitted to a remote server (e.g., remote server 176 via external communication system 170) for analysis. Such analysis is intended to facilitate inventory management, e.g., by identifying a food item being added to and/or removed from the chilled chamber.

Now that the construction and configuration of refrigerator appliance 100 and camera assembly 190 have been presented according to an example embodiment of the present disclosure, an example for operating a camera assembly 190 is provided. With reference to the example embodiments of refrigerator appliance 100 that are described above and illustrated in FIGS. 1, 2, and 3, in some embodiments, controller 156 can be configured to operate camera assembly 190, or to operate any other suitable camera assembly for monitoring appliance operation and/or inventory. In these embodiments, camera assembly 190 of refrigerator appliance 100 can obtain one or more images within fresh food chamber 122, which can include in its field of view a plurality of objects 182. In this regard, camera assembly 190 of refrigerator appliance 100 can obtain one or more images of fresh food chamber 122, freezer chamber 124, or any other zone or region within or around refrigerator appliance 100.

Specifically, according to an example embodiment, camera 192 can be oriented down from a top center of cabinet 102 and can have a field of view that covers a width of fresh food chamber 122. Moreover, this field of view can be centered on front opening 132 at a front of cabinet 102, e.g., where refrigerator doors 128 are seated against a front of cabinet 102. In this manner, the field of view of camera 192, and the resulting images obtained, can capture any motion or movement of an object into and/or out of fresh food chamber 122. The images obtained by camera assembly 190 can include one or more still images, one or more video clips, or any other suitable type and number of images suitable for identification of objects 182 (e.g., food items, beverages) or inventory analysis.

Notably, camera assembly 190 can obtain images upon any suitable trigger, such as a time-based imaging schedule where camera assembly 190 periodically images and monitors fresh food chamber 122. According to still other embodiments, camera assembly 190 can periodically take relatively low-resolution images until motion is detected (e.g., via image differentiation of low-resolution images), at which time one or more relatively high-resolution images can be obtained. According to still other embodiments, refrigerator appliance 100 can include one or more motion sensors (e.g., optical, acoustic, electromagnetic, etc.) that are triggered when an object 182 is being added to or removed from fresh food chamber 122, and camera assembly 190 can be operably coupled to such motion sensors to obtain images of the object 182 during such movement.

According to still other embodiments, refrigerator appliance 100 can include a door switch that detects when refrigerator door 128 is opened, at which point camera assembly 190 can begin obtaining one or more images. According to example embodiments, camera assembly 190 can obtain such image(s) continuously or periodically while refrigerator doors 128 are open. In this regard, camera assembly 190 can obtain such image(s) based at least in part on (e.g., in response to) determining that the door of the refrigerator appliance is open and based at least in part on making such a determination, camera assembly 190 can capture images at a set frame rate while the door is open. Notably, the motion of the food items between image frames can be used by, for example, controller 156 to determine whether the object 182 is being removed from or added into fresh food chamber 122. It should be appreciated that the images obtained by camera assembly 190 can vary in number, frequency, angle, resolution, detail, etc. in order to improve the clarity of objects 182. In addition, according to example embodiments, controller 156 can be configured for illuminating a refrigerator light (not shown) while obtaining the image(s). Other suitable triggers are possible and within the scope of the present disclosure.

In some embodiments, an analyze of the image(s) obtained by camera assembly 190 (e.g., via camera(s) 192) can be performed using a machine learning image recognition process to identify an object in one or more of such image(s). It should be appreciated that this analysis can include the use of any suitable image analysis techniques, image decomposition, image segmentation, image processing, etc. This analysis can be performed entirely by controller 156, can be offloaded to a remote server (e.g., remote server 176) for analysis, can be performed with user assistance (e.g., via control panel 152), or can be performed in any other suitable manner. According to example embodiments of the present disclosure, the analysis can include a machine learning image recognition process.

According to example embodiments, this image analysis can include the use (e.g., by controller 156, remote server 176) of any suitable image processing technique, image recognition process, etc. As used herein, the terms "image analysis" and the like can be used generally to refer to any suitable method of observation, analysis, image decomposition, feature extraction, image classification, etc. of one or more images, videos, or other visual representations of an object. As explained in more detail below, this image analysis can include the implementation (e.g., by controller 156, remote server 176) of image processing techniques, image recognition techniques, or any suitable combination thereof. In this regard, the image analysis can include the use (e.g., by controller 156, remote server 176) of any suitable image analysis software or algorithm to constantly or periodically monitor a moving object within fresh food chamber 122. It should be appreciated that this image analysis or processing can be performed locally (e.g., by controller 156) or remotely (e.g., by offloading image data to a remote server or network, e.g., remote server 176).

Specifically, the analysis of the one or more images can include implementation (e.g., by controller 156, remote server 176) of one or more image processing algorithms. As used herein, the terms "image processing" and the like are generally intended to refer to any suitable methods or algorithms for analyzing images that do not rely on artificial intelligence or machine learning techniques (e.g., in contrast to the machine learning image recognition processes described below). For example, the image processing algorithm(s) can rely on image differentiation, e.g., such as a pixel-by-pixel comparison of two sequential images. This comparison can help identify substantial differences between the sequentially obtained images, e.g., to identify movement, the presence of a particular object, the existence of a certain condition, etc. For example, one or more reference images can be obtained (e.g., by controller 156 and/or remote server 176 via camera assembly 190 and/or camera(s) 192) when a particular condition exists, and these references images can be stored (e.g., by controller 156, remote server 176) for future comparison with images obtained during appliance operation. Similarities and/or differences between the reference image and the obtained image can be used (e.g., by controller 156, remote server 176) to extract useful information for improving appliance performance. For example, image differentiation can be used (e.g., by controller 156, remote server 176) to determine when a pixel level motion metric passes a predetermined motion threshold.

The image processing algorithm(s) can further include measures for isolating or eliminating noise in the image comparison, e.g., due to image resolution, data transmission errors, inconsistent lighting, or other imaging errors. By eliminating such noise, the image processing algorithm(s) can improve accurate object detection, avoid erroneous object detection, and isolate the important object, region, or pattern within an image. In addition, or alternatively, the image processing algorithm(s) can use other suitable techniques for recognizing or identifying particular items or objects, such as edge matching, divide-and-conquer searching, greyscale matching, histograms of receptive field responses, or another suitable routine (e.g., executed at controller 156 or remote server 176 based on one or more captured images from one or more cameras). Other image processing techniques that can be implemented (e.g., by controller 156, remote server 176) in accordance with one or more embodiments of the present disclosure are possible and within the scope of the present disclosure.

In addition to the image processing techniques described above, the image analysis can include utilizing (e.g., by controller 156, remote server 176) artificial intelligence (AI), such as a machine learning image recognition process, a neural network classification module, any other suitable artificial intelligence (AI) technique, and/or any other suitable image analysis techniques, examples of which will be described in more detail below. Moreover, each of the example image analysis or evaluation processes described below can be used (e.g., by controller 156, remote server 176) independently, collectively, or interchangeably to extract detailed information regarding the images being analyzed to facilitate performance of one or more methods described herein or to otherwise improve appliance operation. According to example embodiments, any suitable number and combination of image processing, image recognition, or other image analysis techniques can be used (e.g., by controller 156, remote server 176) to obtain an accurate analysis of the obtained images.

In this regard, the image recognition process can include the use (e.g., by controller 156, remote server 176) of any suitable artificial intelligence technique, for example, any suitable machine learning technique, or for example, any suitable deep learning technique. According to an example embodiment, the image recognition process can include the implementation (e.g., by controller 156, remote server 176) of a form of image recognition called region based convolutional neural network (R-CNN) image recognition. Generally speaking, R-CNN can include taking an input image and extracting region proposals that include a potential object or region of an image. In this regard, a "region proposal" can be one or more regions in an image that could belong to a particular object or can include adjacent regions that share common pixel characteristics. A convolutional neural network is then used (e.g., by controller 156, remote server 176) to compute features from the region proposals and the extracted features will then be used (e.g., by controller 156, remote server 176) to determine a classification for each particular region.

According to still other embodiments, an image segmentation process can be used (e.g., by controller 156, remote server 176) along with the R-CNN image recognition. In general, image segmentation creates a pixel-based mask for each object in an image and provides a more detailed or granular understanding of the various objects within a given image. In this regard, instead of processing an entire image—that is (i.e.), a large collection of pixels, many of which might not contain useful information—image segmentation can involve dividing an image into segments (e.g., into groups of pixels containing similar attributes) that can be analyzed (e.g., by controller 156, remote server 176) independently or in parallel to obtain a more detailed representation of the object or objects in an image. This can be referred to herein as "mask R-CNN" and the like, as opposed to a regular R-CNN architecture. For example, mask R-CNN can be based on fast R-CNN which is slightly different than R-CNN. For example, R-CNN first applies a convolutional neural network (CNN) and then allocates it to zone recommendations on the property map instead of the initially split into zone recommendations. In addition, according to example embodiments, standard CNN can be used (e.g., by controller 156, remote server 176) to obtain, identify, or detect any other qualitative or quantitative data related to one or more objects or regions within the one or more images. In additional or alternative embodiments, a K-means algorithm can be used (e.g., by controller 156, remote server 176).

According to still other embodiments, the image recognition process can include the use (e.g., by controller 156, remote server 176) of any other suitable neural network process while remaining within the scope of the present disclosure. For example, the analysis (e.g., by controller 156, remote server 176) of the one or more images can include using (e.g., by controller 156, remote server 176) a deep belief network (DBN) image recognition process. A DBN image recognition process can generally include stacking many individual unsupervised networks that use each network's hidden layer as the input for the next layer. According to still other embodiments, the analysis (e.g., by controller 156, remote server 176) of the one or more images can include the implementation (e.g., by controller 156, remote server 176) of a deep neural network (DNN) image recognition process, which generally includes the use (e.g., by controller 156, remote server 176) of a neural network (e.g., computing systems inspired by and/or based on the biological neural networks) with multiple layers between input and output. Other suitable image recognition processes, neural network processes, artificial intelligence analysis techniques, and combinations of the above described or other known methods can be used (e.g., by controller 156, remote server 176) while remaining within the scope of the present disclosure.

In addition, it should be appreciated that various transfer techniques can be used (e.g., by controller 156, remote server 176) but use of such techniques is not required. If using (e.g., by controller 156, remote server 176) transfer techniques learning, a neural network architecture can be pretrained such as VGG16, VGG19, or ResNet50 with a public dataset then the last layer can be retrained (e.g., by controller 156, remote server 176) with an appliance specific dataset. In addition, or alternatively, the image recognition process can include detection (e.g., by controller 156, remote server 176) of certain conditions based on comparison (e.g., by controller 156, remote server 176) of initial conditions and/or can rely on image subtraction techniques, image stacking techniques, image concatenation, etc. For example, the subtracted image can be used (e.g., by controller 156, remote server 176) to train a neural network with multiple classes for future comparison and image classification.

It should be appreciated that the machine learning image recognition models can be actively trained by the appliance (e.g., by controller 156) with new images, can be supplied with training data from the manufacturer or from another remote source (e.g., external device 172, remote server 176), or can be trained in any other suitable manner. For example, according to example embodiments, this image recognition process relies at least in part on a neural network trained (e.g., by controller 156, remote server 176) with a plurality of images of the appliance in different configurations, experiencing different conditions, or being interacted with in different manners. This training data can be stored (e.g., by controller 156, remote server 176) locally or remotely and can be communicated (e.g., by controller 156) to a remote server (e.g., remote server 176) for training other appliances and models.

It should be appreciated that image processing and machine learning image recognition processes can be used together (e.g., by controller 156, remote server 176) to facilitate improved image analysis, object detection, or to extract other useful qualitative or quantitative data or information from the one or more images that can be used to improve the operation or performance of the appliance. Indeed, the methods described herein can include the use (e.g., by controller 156, remote server 176) of any or all of these techniques interchangeably to improve image analysis process and facilitate improved appliance performance and consumer satisfaction. The image processing algorithm(s) and machine learning image recognition processes described herein are only examples and are not intended to limit the scope of the present disclosure in any manner.

Thus, in at least one embodiment, controller 156 and/or remote server 176 can obtain (e.g., via camera assembly 190 and/or camera(s) 192) a plurality of images of objects 182 being added to or removed from the chilled chamber. In this regard, controller 156, remote server 176, and/or another suitable processing device can analyze these images to identify objects 182 and/or their trajectories into or out of fresh food chamber 122 and/or freezer chamber 124. By identifying whether objects 182 are being added to or removed from fresh food chamber 122 and/or freezer chamber 124, controller 156, remote server 176, and/or another suitable processing device can monitor and track inventory within refrigerator appliance 100. For example, controller 156, remote server 176, and/or another suitable processing device can maintain a record of food items positioned within or removed from fresh food chamber 122.

Figure 3:
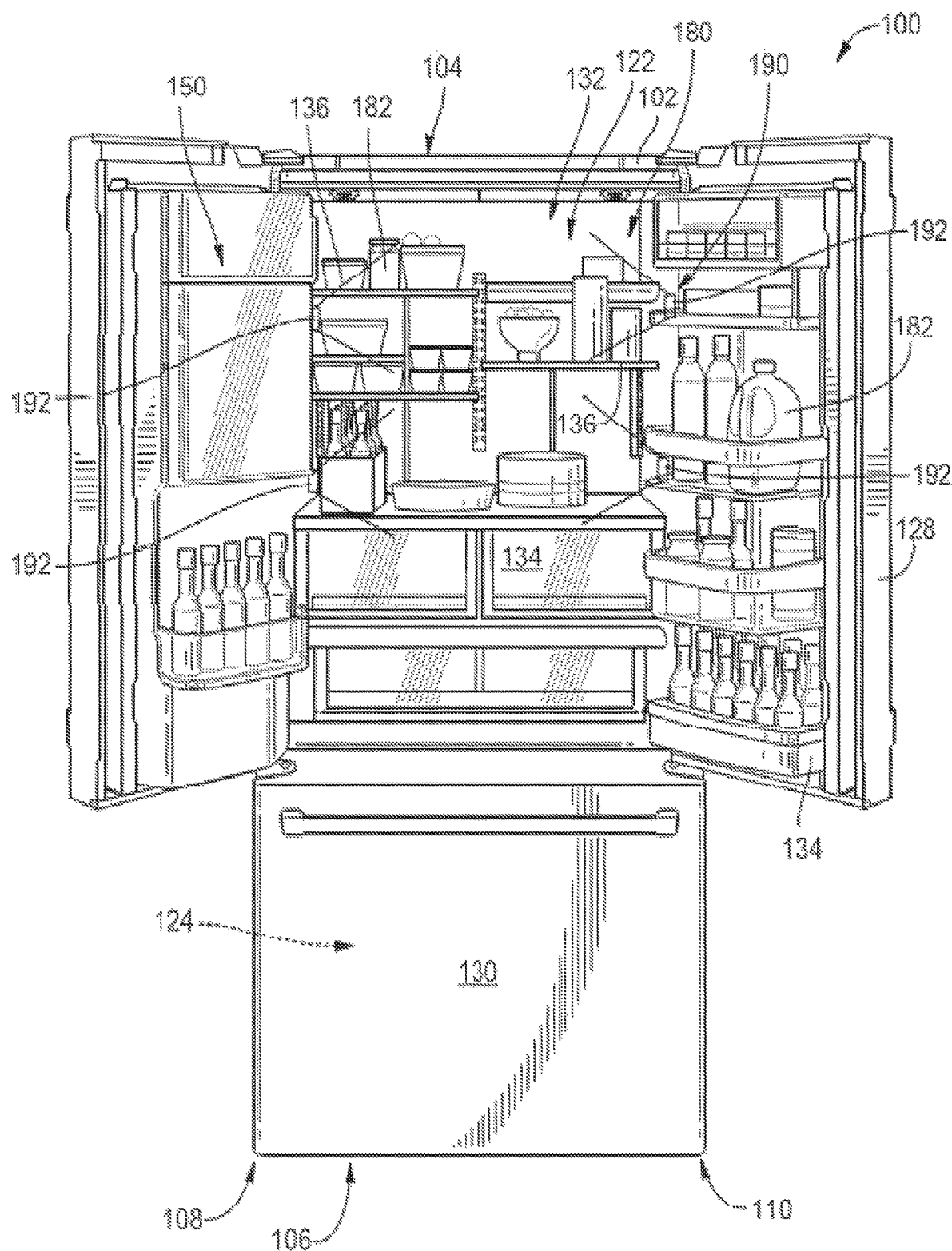
FIG. 3 illustrates a perspective view of the example, non-limiting refrigerator appliance of FIG. 1 including an example, non-limiting inventory management system having a plurality of cameras according to one or more example embodiments of the present disclosure.
Figure 4:
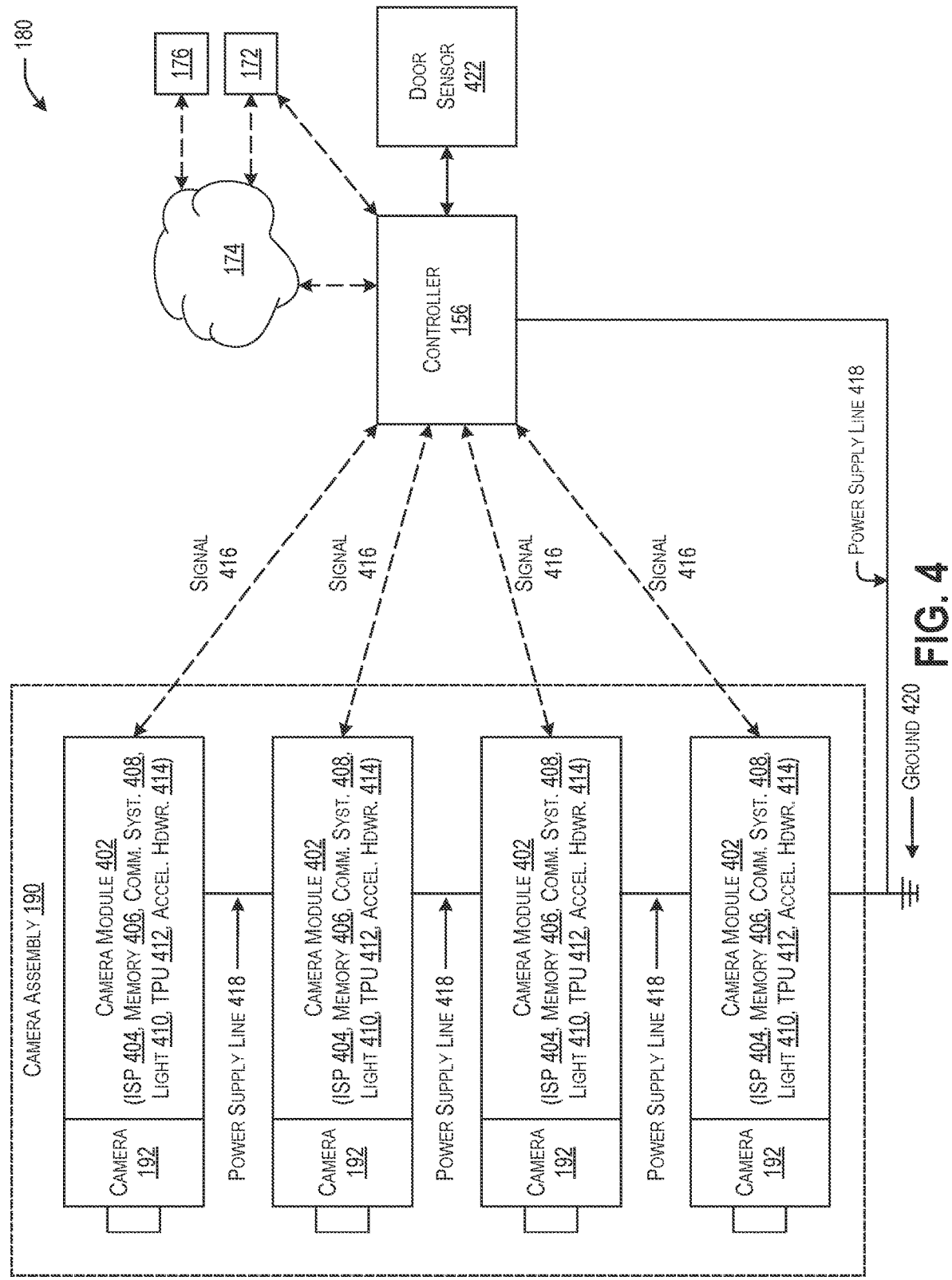
FIG. 4 illustrates a block diagram of the example, non-limiting inventory management system of FIGS. 2 and/or 3 according to one or more example embodiments of the present disclosure.

FIG. 4 illustrates a block diagram of inventory management system 180 according to one or more example embodiments of the present disclosure. As described above with reference to the example embodiments depicted in FIGS. 1, 2, and 3, inventory management system 180 can be included in, coupled to, and/or otherwise associated with refrigerator appliance 100 to monitor fresh food chamber 122 and/or freezer chamber 124 to detect objects 182 (e.g., food items, beverages) that are inserted into, positioned in, and/or removed from fresh food chamber 122 and/or freezer chamber 124.

As illustrated in the example embodiment depicted in FIG. 4, inventory management system 180 can include camera assembly 190 described above with reference to the example embodiments depicted in FIGS. 1, 2, and 3. In the example embodiment illustrated in FIG. 4, camera assembly 190 can be coupled to cabinet 102 of refrigerator appliance 100 and can be configured and/or operable to perform and/or facilitate such monitoring of fresh food chamber 122 and/or freezer chamber 124 to detect objects 182 (e.g., food items, beverages) that are inserted into, positioned in, and/or removed from fresh food chamber 122 and/or freezer chamber 124 as described above.

In the example embodiment depicted in FIG. 4, camera assembly 190 can include one or more cameras 192 and/or one or more camera modules 402. For instance, in this and/or another embodiment, camera assembly 190 can include one or more cameras 192 that can be respectively included in, coupled to (e.g., communicatively, operatively), and/or otherwise associated with one or more camera modules 402. In this and/or another embodiment, each camera module 402 can be configured and/or operable to operate a corresponding camera 192 that can be included in, coupled to (e.g., communicatively, operatively), and/or otherwise associated with a corresponding camera module 402. In this and/or another embodiment, each camera 192 can be positioned on and/or in refrigerator appliance 100 such that camera 192 can monitor a chilled chamber of refrigerator appliance 100 such as, for instance, fresh food chamber 122 and/or freezer chamber 124, as well as the contents (e.g., objects 182) of such a chilled chamber. In this and/or another embodiment, each camera 192 can be configured and/or operable to capture data (e.g., image(s), video, audio) associated with such a chilled chamber (e.g., fresh food chamber 122 and/or freezer chamber 124) of refrigerator appliance 100 and/or the contents (e.g., objects 182) of the chilled chamber.

As illustrated in the example embodiment depicted in FIG. 4, each camera module 402 can include and/or be coupled to, for instance: an image signal processor (ISP) 404 (denoted as "ISP 404" in FIG. 4); a memory element 406 (denoted as "Memory 406" in FIG. 4); a communication system 408 (denoted as "Comm. Syst. 408" in FIG. 4); a light 410; a tensor processing unit (TPU) 412 (denoted as "TPU 412" in FIG. 4); and/or acceleration hardware 414 (denoted as "Accel. Hdwr. 414" in FIG. 4). In this and/or another embodiment, each of one or more camera modules 402 can be coupled (e.g., communicatively, operatively, wirelessly) to controller 156 by way of a signal 416.

In one or more embodiments, each signal 416 can constitute a control signal (e.g., control command(s), instruction(s)), a communication signal (e.g., data signal), a modulated signal (e.g., a modulated signal including one or more control and/or communication signals), a radio frequency (RF) signal, an electromagnetic signal, and/or another type of signal that can communicatively and/or operatively couple each of one or more camera modules 402 to controller 156. In the example embodiment depicted in FIG. 4, each signal 416 can be a Bluetooth® signal.

As illustrated in the example embodiment depicted in FIG. 4, inventory management system 180 can further include a power supply line 418 that can be coupled (e.g., communicatively, electrically, operatively) to controller 156 and to each of one or more camera module(s) 402. As illustrated in FIG. 4, inventory management system 180 can further include: a ground 420 that can be coupled (e.g., electrically, operatively) to power supply line 418; and/or a door sensor 422 that can be coupled (e.g., communicatively, electrically, operatively) to controller 156. In the example embodiment depicted in FIG. 4, door sensor 422 can be configured and/or operable to detect when a door associated with refrigerator appliance 100 has been opened and/or closed. For example, in this and/or another, door sensor 422 can be configured and/or operable to detect when refrigerator door 128 and/or freezer door 130 has been opened and/or closed.

In the example embodiment depicted in FIG. 4, controller 156, power supply line 418, and ground 420 can function together to provide electrical energy (e.g., electricity, power) and/or signals (e.g., control signals, communication signals, data signals) to each of one or more camera modules 402. For example, in this and/or another embodiment, controller 156, power supply line 418, and ground 420 can function together to provide, for instance, five volts (5V) to camera module(s) 402, as well as control and/or communication signals (e.g., control command(s) and/or instruction(s), data signal(s), media signal(s), modulated signal(s) having control command(s) and data).

For purposes of clarity and brevity, the functionality of camera modules 402 and/or the components respectively associated therewith may be described herein with respect to a single camera module 402 and/or the components associated therewith, the present disclosure is not so limiting. For instance, in example embodiments of the present disclosure: each camera module 402 can be configured and/or operable to function in the same manner as all camera modules 402 illustrated in FIG. 4; each image signal processor 404 can be configured and/or operable to function in the same manner as all image signal processors 404 illustrated in FIG. 4; each memory element 406 can be configured and/or operable to function in the same manner as all memory elements 406 illustrated in FIG. 4; each communication system 408 can be configured and/or operable to function in the same manner as all communication systems 408 illustrated in FIG. 4; each light 410 can be configured and/or operable to function in the same manner as all lights 410 illustrated in FIG. 4; each tensor processing unit 412 can be configured and/or operable to function in the same manner as all tensor processing units 412 illustrated in FIG. 4; each acceleration hardware 414 can be configured and/or operable to function in the same manner as all acceleration hardware 414 illustrated in FIG. 4; and/or each camera 192 can be configured and/or operable to function in the same manner as all cameras 192 illustrated in FIG. 4.

In the example embodiment depicted in FIG. 4, controller 156 can constitute, include, be coupled to, and/or otherwise be associated with a controller (e.g., a microprocessor) such as, for instance, a single board computer (SBC) and/or a master control unit (MCU). In this example embodiment, controller 156 can be further coupled (e.g., communicatively, operatively) to external device 172 and/or remote server 176 by way of network 174 and/or external communication system 170 (not illustrated in FIG. 4) as described above with reference to the example embodiments depicted in FIGS. 1, 2, and 3.

In the example embodiment depicted in FIG. 4, each camera module 402 and/or each camera 192 can constitute and/or include a mobile industry processor interface (MIPI) camera module and/or camera, respectively (e.g., an MIPI camera module and/or an MIPI camera). Although the example embodiment illustrated in FIG. 4 is depicted and described herein as having a specific quantity (e.g., four) of camera modules 402 (e.g., MIPI camera modules) and/or cameras 192 (e.g., MIPI cameras), the present disclosure is not so limiting. For example, use of any quantity (e.g., two or more) of MIPI or other camera modules, cameras, and/or hardware can be implemented in accordance with one or more embodiments described herein without deviating from the intent and/or scope of the present disclosure. For instance, different combinations of other types and/or quantities (e.g., two or more) of camera modules 402, cameras 192 (e.g., universal serial bus (USB) cameras), and/or hardware (e.g., universal serial bus (USB) cables, coaxial cables) can be implemented in accordance with one or more embodiments described herein without deviating from the intent and/or scope of the present disclosure.

In the example embodiment illustrated in FIG. 4, controller 156 and camera module 402 can be configured and/or operable to, for instance: respectively perform one or more operations of an authentication process to verify the respective identity of controller 156 and camera module 402. Additionally, or alternatively, in this and/or another embodiment, camera module 402 can be configured and/or operable to operate camera 192 to capture data (e.g., image(s), video, audio) associated with a chilled chamber of refrigerator appliance 100 such as, for instance, fresh food chamber 122 and/or freezer chamber 124 based at least in part on verification of the respective identity of controller 156 and camera module 402.

In the example embodiment depicted in FIG. 4, controller 156 and camera module 402 can each be configured and/or operable to perform the authentication process during a power up process associated with refrigerator appliance 100 and/or one or more components included in, coupled to, and/or otherwise associated with refrigerator appliance 100. For example, in this and/or another embodiment, controller 156 and camera module 402 can each be configured and/or operable to perform the authentication process during a power up process associated with: refrigerator appliance 100; a chilled chamber of refrigerator appliance 100 such as, for instance, fresh food chamber 122 and/or freezer chamber 124; controller 156; inventory management system 180; camera assembly 190, camera module 402; and/or camera 192.

In some embodiments, controller 156 and camera module 402 can each be configured and/or operable to perform the authentication process during a power up process such as, for instance, an initial (e.g., first) and/or subsequent power up process (e.g., connection to power supply and/or turning on), an initial and/or subsequent startup and/or commissioning process, an initial and/or subsequent boot up process (e.g., loading of an operating system and/or software associated with controller 156 and/or camera module 402), and/or another power up process that can be associated with refrigerator appliance 100 and/or one or more components associated therewith. In some embodiments, controller 156 and camera module 402 can each be configured and/or operable to perform the authentication process periodically, for example, at pre-defined intervals (e.g., once every 5 minutes, once every 1 hour, once every day).

In the example embodiment depicted in FIG. 4, controller 156 and camera module 402 can each be configured and/or operable to perform the authentication process while one or more doors of one or more chilled chambers associated with refrigerator appliance 100 are in a closed position. For example, in this and/or another embodiment, controller 156 and camera module 402 can each be configured and/or operable to perform the authentication process while refrigerator door 128 and/or freezer door 130 is in a closed position.

In the example embodiment illustrated in FIG. 4, to perform the authentication process, controller 156 and camera module 402 can each be configured and/or operable to respectively perform one or more operations that allow each to verify and/or confirm their identity to the other. For example, in this and/or another embodiment, controller 156 can perform one or more operations of the authentication process that, once completed, serve to provide verification and/or confirmation of the identity of controller 156 to camera module 402. Similarly, in this and/or another embodiment, camera module 402 can perform (e.g., using one or more components of camera module 402) one or more operations of the authentication process that, once completed, serve to provide verification and/or confirmation of the identity of camera module 402 to controller 156. It should be appreciated that the authentication process described herein according to example embodiments can constitute a "secure and/or trust handshake" that establishes a "trust relationship" between controller 156 and camera module 402.

In the example illustrated in FIG. 4, the one or more operations that controller 156 can be configured and/or operable to perform to complete the authentication process can include cycling an interior light of a chilled chamber of refrigerator appliance 100 on and off. For example, in this and/or another embodiment, controller 156 can cycle an interior light (not illustrated) of fresh food chamber 122 and/or freezer chamber 124 on and off. For instance, in one embodiment, controller 156 can cycle an interior light (not illustrated) of fresh food chamber 122 and/or freezer chamber 124 on and off while refrigerator door 128 and/or freezer door 130, respectively, is in a closed position.

In some embodiments, controller 156 can be configured and/or operable to cycle an interior light of fresh food chamber 122 and/or freezer chamber 124 on and off according to and/or using a defined illumination level and/or a defined sequence or pattern. For instance, in one embodiment, controller 156 can be configured and/or operable to cycle such an interior light on and off such that the interior light outputs a defined illumination level when cycled on (e.g., such that the interior light outputs a certain number of lumens when cycled on). In another embodiment, controller 156 can be configured and/or operable to cycle such an interior light on and off according to and/or using a defined sequence or pattern such that, for instance: the interior light is turned on for a first duration and turned off for a second duration (e.g., the first and second duration can be the same or different); and/or the interior light is turned on a first number of times and turned off a second number of times (e.g., the first and second number of times can be the same or different).

In the example embodiment depicted in FIG. 4, the on and off cycling by controller 156 of an interior light of a chilled chamber (e.g., fresh food chamber 122 and/or freezer chamber 124) of refrigerator appliance 100 can be indicative of the identity of controller 156. For instance, in this and/or another embodiment, the on and off cycling by controller 156 of such an interior light according to and/or using a defined illumination level and/or a defined sequence or pattern as described above can serve as a communication to camera module 402 that such cycling of the interior light is being performed and/or facilitated by controller 156. As such, in this and/or another embodiment, such on and off cycling by controller 156 of such an interior light can constitute a verification and/or confirmation of the identity of controller 156 to camera module 402.

In the example embodiment illustrated in FIG. 4, the one or more operations that camera module 402 can be configured and/or operable to perform (e.g., using one or more components of camera module 402) to complete the authentication process can include operating camera 192 to detect a defined illumination level of an interior light of a chilled chamber of refrigerator appliance 100 while the interior light is being cycled on and off by controller 156. For example, in this and/or another embodiment, camera module 402 can be configured and/or operable to operate camera 192 in a manner that allows camera 192 to detect the above-described defined illumination level (e.g., a certain number of lumens) of an interior light of fresh food chamber 122 and/or freezer chamber 124 while the interior light is being cycled on and off by controller 156 such that the interior light outputs the defined illumination level when cycled on.

In the example embodiment illustrated in FIG. 4, the one or more operations that camera module 402 can be configured and/or operable to perform (e.g., using one or more components of camera module 402) to complete the authentication process can further include transmitting a signal to controller 156 based at least in part on (e.g., in response to) detection by camera module 402 (e.g., using camera 192) of a defined illumination level of an interior light of a chilled chamber of refrigerator appliance 100 while the interior light is being cycled on and off by controller 156. For example, in this and/or another embodiment, camera module 402 can be configured and/or operable to send controller 156 a communication and/or data signal that can indicate to controller 156 that camera module 402 has detected (e.g., using camera 192) the above-described defined illumination level (e.g., a certain number of lumens) of an interior light of fresh food chamber 122 and/or freezer chamber 124 while the interior light was being cycled on and off by controller 156.

In the example embodiment depicted in FIG. 4, the detection of the defined illumination level and/or transmittal of the signal by camera module 402 to controller 156 to indicate that camera module 402 has detected the defined illumination level can be indicative of the identity of camera module 402. For instance, in this and/or another embodiment, such detection of the defined illumination level and/or transmittal of the signal by camera module 402 to controller 156 can serve as a communication to controller 156 that such detection of the defined illumination level of the interior light was performed and/or facilitated by camera module 402. As such, in this and/or another embodiment, such detection of the defined illumination level and/or transmittal of the signal by camera module 402 to controller 156 indicating such detection can constitute a verification and/or confirmation of the identity of camera module 402 to controller 156.

In the example embodiment depicted in FIG. 4, camera module 402 can be configured and/or operable to transmit the above-described signal (e.g., indicating camera module 402 has detected the defined illumination level) to controller 156 using a wired or wireless communication system according to one or more embodiments described herein. For example, in this and/or another embodiment, camera module 402 can be configured and/or operable to transmit the above-described signal to controller 156 using, for instance, communication system 408, signal 416, power supply line 418, external communication system 170, and/or network 174.

In the example embodiment illustrated in FIG. 4, the one or more operations that controller 156 can be configured and/or operable to perform to complete the authentication process can include cycling a power supply of camera module 402 on and off. For example, in this and/or another embodiment, controller 156 can be configured and/or operable to cycle a power supply of camera module 402 on and off by interrupting and restoring the power (e.g., electricity) that can be provided to camera module 402 by way of, for instance, power supply line 418 and ground 420. For instance, in one embodiment, controller 156 can be configured and/or operable to control a power switch (not illustrated) that can be included with, coupled to, and/or otherwise associated with camera module 402. In this and/or another embodiment, controller 156 can be configured and/or operable to cycle such a power switch on and off to interrupt and restore power to camera module 402. In another embodiment, controller 156 can be configured and/or operable to short power supply line 418 (e.g., using a shunt) and/or short a circuit coupled to power supply line 418 such that power to camera module 402 can be interrupted and restored.

In some embodiments, controller 156 can be configured and/or operable to cycle a power supply of camera module 402 on and off according to and/or using a defined sequence or pattern. For instance, in one embodiment, controller 156 can be configured and/or operable to cycle such a power supply on and off according to and/or using a defined sequence or pattern such that, for example: the power supply is turned on for a first duration and turned off for a second duration (e.g., the first and second duration can be the same or different); and/or the power supply is turned on a first number of times and turned off a second number of times (e.g., the first and second number of times can be the same or different).

In the example embodiment depicted in FIG. 4, the on and off cycling by controller 156 of a power supply to camera module 402 can be indicative of the identity of controller 156. For instance, in this and/or another embodiment, the on and off cycling by controller 156 of such a power supply (e.g., according to and/or using a defined sequence or pattern as described above) can serve as a communication to camera module 402 that such cycling of the power supply is being performed and/or facilitated by controller 156. As such, in this and/or another embodiment, such on and off cycling by controller 156 of a power supply to camera module 402 can constitute a verification and/or confirmation of the identity of controller 156 to camera module 402.

In the example embodiment illustrated in FIG. 4, the one or more operations that camera module 402 can be configured and/or operable to perform (e.g., using one or more components of camera module 402) to complete the authentication process can further include transmitting a signal to controller 156 based at least in part on (e.g., in response to) detection by camera module 402 of the above-described on and off cycling by controller 156 of a power supply to camera module 402. For example, in this and/or another embodiment, camera module 402 can be configured and/or operable to send controller 156 a communication and/or data signal that can indicate to controller 156 that camera module 402 has detected the on and off cycling of its power supply by controller 156 (e.g., that camera module 402 has detected the above-described defined sequence or pattern of on and off cycling of its power supply by controller 156).

In the example embodiment depicted in FIG. 4, the detection of the on and off cycling of a power supply to camera module 402 and/or transmittal of the signal by camera module 402 to controller 156 to indicate that camera module 402 has detected such power supply cycling can be indicative of the identity of camera module 402. For instance, in this and/or another embodiment, such detection of the on and off cycling of a power supply to camera module 402 and/or transmittal of the signal by camera module 402 to controller 156 can serve as a communication to controller 156 that such detection of the power supply cycling was performed and/or facilitated by camera module 402. As such, in this and/or another embodiment, such detection of the on and off cycling of a power supply to camera module 402 and/or transmittal of the signal by camera module 402 to controller 156 indicating such detection can constitute a verification and/or confirmation of the identity of camera module 402 to controller 156.

In the example embodiment depicted in FIG. 4, as described above, camera module 402 can be configured and/or operable to transmit the above-described signal (e.g., indicating camera module 402 has detected the on and off cycling of its power supply) to controller 156 using a wired or wireless communication system according to one or more embodiments described herein. For example, in this and/or another embodiment, camera module 402 can be configured and/or operable to transmit the above-described signal to controller 156 using, for instance, communication system 408, signal 416, power supply line 418, external communication system 170, and/or network 174.

In the example embodiment illustrated in FIG. 4, the one or more operations that camera module 402 can be configured and/or operable to perform (e.g., using one or more components of camera module 402) to complete the authentication process can further include operating camera 192 to capture an image of an interior portion of a chilled chamber of refrigerator appliance 100 such as, for instance, fresh food chamber 122 and/or freezer chamber 124. In this and/or another embodiment, the image of the interior portion of such a chilled chamber (e.g., fresh food chamber 122 and/or freezer chamber 124) that can be captured by camera 192 can include one or more defined features of the interior portion of the chilled chamber such as, for instance, one or more interior lights and/or one or more other features (e.g., compartment(s), drawer(s), interior door(s), signage) respectively positioned in the chilled chamber at one or more certain locations.

In the example embodiment described above, such one or more defined features respectively positioned in the chilled chamber can be indicative of a location of camera 192 with respect to the chilled chamber (e.g., fresh food chamber 122 and/or freezer chamber 124), the interior portion of the chilled chamber, and/or the one or more defined features. For instance, in this and/or another embodiment, the one or more defined features of the interior portion of fresh food chamber 122 and/or freezer chamber 124 that can be included in the image that can be captured by camera 192 can be indicative of the location of camera 192 inside fresh food chamber 122 and/or freezer chamber 124, respectively.

In the example embodiment illustrated in FIG. 4, the one or more operations that camera module 402 can be configured and/or operable to perform (e.g., using one or more components of camera module 402) to complete the authentication process can further include transmitting the above-described image having the one or more defined features of the interior portion of fresh food chamber 122 and/or freezer chamber 124 to controller 156. In this and/or another embodiment, camera module 402 can be configured and/or operable to transmit the image to controller 156 using a wired or wireless communication system according to one or more embodiments described herein. For example, in this and/or another embodiment, camera module 402 can be configured and/or operable to transmit the image to controller 156 using, for instance, communication system 408, signal 416, power supply line 418, external communication system 170, and/or network 174.

In the example embodiment illustrated in FIG. 4, the one or more operations that controller 156 can be configured and/or operable to perform to complete the authentication process can further include: comparing an image template of an interior portion of a chilled chamber of refrigerator appliance 100 with an image of the interior portion of the chilled chamber captured by camera 192; and/or determining whether the image captured by camera 192 matches the image template. For example, in this and/or another embodiment, controller 156 can be configured and/or operable to compare an image template of an interior portion of fresh food chamber 122 and/or freezer chamber 124 with the above-described image of the interior portion of fresh food chamber 122 and/or freezer chamber 124 that can be captured by camera 192; and/or determining whether the image captured by camera 192 matches the image template.

In the example embodiment depicted in FIG. 4, to determine whether the image captured by camera 192 matches the image template, controller 156 can be configured and/or operable to determine whether one or more defined features are respectively positioned at one or more defined locations in each of the image template and the image captured by camera 192. For example, controller 156 can be configured and/or operable to determine whether interior lights appearing in the image template at certain locations inside fresh food chamber 122 and/or freezer chamber 124 also appear in the image captured by camera 192 at the same locations inside fresh food chamber 122 and/or freezer chamber 124, respectively.

In the example embodiment depicted in FIG. 4, to determine whether the image captured by camera 192 matches the image template, controller 156 can be configured and/or operable to implement an image-based recognition process. For instance, in this and/or another embodiment, controller 156 can implement the image recognition process and/or one or more of the machine learning (ML) and/or artificial intelligence (AI) models, algorithms, and/or processes (e.g., CNN, R-CNN, DBN, DNN) described above with reference to the example embodiments illustrated in FIGS. 1, 2, and 3. In this and/or another embodiment, such one or more ML and/or AI models (e.g., CNN, R-CNN, DBN, DNN) can be adapted and/or trained such that the model(s) are configured and/or operable to ingest (e.g., receive as input) the image template and/or the image captured by camera 192 and to determine whether certain features (e.g., interior lights) appear at the same locations (e.g., with respect to the internal portion of fresh food chamber 122 and/or freezer chamber 124) in both the image template and the image captured by camera 192.

In the example embodiment depicted in FIG. 4, a determination by controller 156 that the image captured by camera 192 matches the image template can be indicative of the identity of camera module 402. For instance, in this and/or another embodiment, a determination by controller 156 that certain features (e.g., interior lights) appearing at certain locations in the image captured by camera 192 (e.g., at certain locations of the interior portion of fresh food chamber 122 and/or freezer chamber 124) also appear at the same locations in the image template can constitute a verification and/or confirmation of the identity of camera module 402 to controller 156.

In some embodiments, such a determination by controller 156 that the image captured by camera 192 matches the image template can be indicative of the operational status of camera module 402 and/or camera 192. For example, in these embodiments, the quality of the image captured by camera 192 can be indicative of how well or how poorly camera module 402 and/or camera 192 is operating. For instance, in the embodiments, a relatively blurry image captured by camera 192 can be indicative of camera module 402 and/or camera 192 functioning poorly, while a relatively clear image captured by camera 192 can be indicative of camera module 402 and/or camera 192 functioning properly.

In some embodiments, the above-described image template of an interior portion of fresh food chamber 122 and/or freezer chamber 124 can constitute an image of such an interior portion of fresh food chamber 122 and/or freezer chamber 124 that can be captured (e.g., by camera 192) and/or obtained by controller 156 before the authentication process of the present disclosure is performed. In some embodiments, the image template of an interior portion of fresh food chamber 122 and/or freezer chamber 124 can constitute a diagram (e.g., an engineering and/or design diagram, manufacturing diagram, blueprint) of such an interior portion of fresh food chamber 122 and/or freezer chamber 124 that can be obtained by controller 156 before the authentication process of the present disclosure is performed. In some embodiments, the image template can be stored (e.g., by controller 156) in, for instance, a memory element that can be included in, coupled to, accessible by, and/or otherwise associated with controller 156.

In the example embodiment depicted in FIG. 4, based at least in part on controller 156 and camera module 402 completing the above-described authentication process such that the respective identity of controller 156 and camera module 402 is verified, camera module 402 can operate camera 192 to capture data (e.g., image(s), video, audio) associated with a chilled chamber of refrigerator appliance 100 such as, for instance, fresh food chamber 122 and/or freezer chamber 124. For instance, in this and/or another embodiment, camera module 402 can be configured and/or operable to operate camera 192 to capture image data (e.g., one or more images), video data (e.g., video, video frames), and/or audio data (e.g., audio) of fresh food chamber 122 and/or freezer chamber 124 (e.g., of interior portions of fresh food chamber 122 and/or freezer chamber 124) and/or the contents (e.g., objects 182) thereof.

In the example embodiment depicted in FIG. 4, to capture the data associated with fresh food chamber 122 and/or freezer chamber 124, camera module 402 can use image signal processor 404. In at least one embodiment, image signal processor 404 can be configured and/or operable to operate camera module 402 and/or camera 192 based at least in part on (e.g., using, employing, implementing) a mobile industry processor interface (MIPI) specification that supports (e.g., provides, enables, facilitates, allows for, implements) functionality associated with the data (e.g., image data, video data, audio data). In this and/or another embodiment, image signal processor 404 can be configured and/or operable to process image data, video data, and/or audio data according to one or more example embodiments described herein. In the example embodiment illustrated in FIG. 4, image signal processor 404 can use such an MIPI specification to allow (e.g., enable) camera module 402 and/or image signal processor 404 to capture (e.g., using camera 192) the data associated with fresh food chamber 122 and/or freezer chamber 124.

In the example embodiment depicted in FIG. 4, controller 156 can be configured and/or operable to operate one or more camera modules 402 individually or collectively (e.g., concurrently, simultaneously) by way of signal(s) 416, communication system 408, external communication system 170, and/or power supply line 418. In this and/or another embodiment, camera module 402 can be configured and/or operable to operate camera 192 to capture data (e.g., image(s), video, audio) associated with fresh food chamber 122 and/or freezer chamber 124 based at least in part on (e.g., in response to) a door opening event detected by door sensor 422 that indicates refrigerator door 128 and/or freezer door 130, respectively, has been opened. For example, in this and/or another embodiment, camera module 402 and/or camera 192 can constitute and/or include a camera having at least two-megapixel (2MP) functionality such that it can be configured and/or operable to capture image data (e.g., images) and/or video data (e.g., video, video frames) having resolution of at least 2 MP. In this and/or another embodiment, based at least in part on (e.g., in response to) a door opening event detected by door sensor 422 that indicates refrigerator door 128 and/or freezer door 130 has been opened, controller 156 can operate (e.g., via signals 416, communication system 408, external communication system 170, power supply line 418) two or more camera modules 402 such that two or more cameras 192 concurrently (e.g., simultaneously) capture images, video, and/or audio of one or more objects 182 being added to or removed from fresh food chamber 122 and/or freezer chamber 124 while refrigerator door 128 and/or freezer door 130, respectively, is open.

In some embodiments, when refrigerator door 128 and/or freezer door 130 is in an open position, camera module 402 can operate camera 192 in a relatively normal and/or standard power consumption mode to capture (e.g., continuously, periodically) one or more relatively high-resolution images and/or video (e.g., video samples, frames) of fresh food chamber 122 and/or freezer chamber 124, respectively. In some embodiments, in addition to or alternative to using door sensor 422 to detect a door opening event of refrigerator door 128 and/or freezer door 130, tensor processing unit 412 can implement one or more visual data detection models and/or algorithms described herein that can analyze the above-described relatively high-resolution image(s) and/or video (e.g., video samples, frames) to determine that refrigerator door 128 and/or freezer door 130 is in an open position.

In the example embodiment depicted in FIG. 4, camera module 402 can be configured and/or operable to operate camera 192 to stop capturing data (e.g., image(s), video, audio) associated with fresh food chamber 122 and/or freezer chamber 124 based at least in part on (e.g., in response to) a door closing event detected by door sensor 422 that indicates refrigerator door 128 and/or freezer door 130, respectively, has been closed. For instance, in one embodiment, based at least in part on (e.g., in response to) a door closing event detected by door sensor 422 that indicates refrigerator door 128 and/or freezer door 130 has been closed, camera module 402 can operate camera 192 such that camera 192 stops capturing the data (e.g., image(s), video, audio) associated with fresh food chamber 122 and/or freezer chamber 124, respectively. In another embodiment, based at least in part on (e.g., in response to) a door closing event detected by door sensor 422 that indicates refrigerator door 128 and/or freezer door 130 has been closed, camera module 402 can operate light 410 and camera 192 in a relatively low power consumption mode to capture one or more relatively low-resolution images and/or video associated with fresh food chamber 122 and/or freezer chamber 124, respectively, as described below.

In some embodiments, when refrigerator door 128 and/or freezer door 130 is in a closed position, camera module 402 can operate camera 192 in a relatively low power consumption mode to capture (e.g., continuously, periodically) one or more relatively low-resolution images and/or video (e.g., video samples, frames) of fresh food chamber 122 and/or freezer chamber 124, respectively. In these and/or other embodiments, camera module 402 can operate light 410 to illuminate at least a portion (e.g., internal portion) of fresh food chamber 122 and/or freezer chamber 124 to an illumination level that facilitates capturing of such relatively low-resolution images and/or video of fresh food chamber 122 and/or freezer chamber 124 by camera 192. In some embodiments, in addition to or alternative to using door sensor 422 to detect a door closing event of refrigerator door 128 and/or freezer door 130, tensor processing unit 412 can implement one or more visual data detection models and/or algorithms described herein that can analyze such relatively low-resolution image(s) and/or video (e.g., video samples, frames) to determine that refrigerator door 128 and/or freezer door 130 is in a closed position.

In some embodiments, camera module 402 can be configured and/or operable to operate camera 192 to stop capturing data (e.g., image(s), video, audio) associated with fresh food chamber 122 and/or freezer chamber 124 based at least in part on (e.g., in response to) a timeout and/or max capture feature. For example, in this and/or another embodiment, camera module 402 can operate camera 192 to stop capturing such data associated with fresh food chamber 122 and/or freezer chamber 124 once a pre-defined duration of time has lapsed (e.g., 5 seconds, 30 seconds, 45 seconds, 60 seconds) and/or when one or more camera module(s) 402 have captured a pre-defined maximum amount of data (e.g., maximum amount of images, video, audio).

In the example embodiment depicted in FIG. 4, camera module 402 can be configured and/or operable to implement a sensitive data detection model to identify and/or redact sensitive data from one or more portions of the data associated with a chilled chamber of refrigerator appliance 100 such as, for instance, fresh food chamber 122 and/or freezer chamber 124. For example, in this and/or another embodiment, camera module 402 can be configured and/or operable to employ tensor processing unit 412 to implement a sensitive data detection model to identify and/or redact (e.g., remove, delete, mask, hide, blur) sensitive data (e.g., image(s), video frames, and/or audio that can be used to identify a user associated with refrigerator appliance 100) from one or more portions of the data associated with fresh food chamber 122 and/or freezer chamber 124.

In some embodiments, to identify and/or redact sensitive data from one or more portions of the data associated with fresh food chamber 122 and/or freezer chamber 124, tensor processing unit 412 can implement one or more image-based and/or audio-based data detection models, algorithms, and/or processes that can be based on and/or utilize ML and/or AI concepts, architectures, processes, and/or techniques. For instance, in these embodiments, tensor processing unit 412 can implement one or more image-based and/or audio-based data detection models, algorithms, and/or processes that can include, but are not limited to, a neural network, an artificial neural network (ANN), a deep neural network, a classifier (e.g., classification algorithm), a convolutional neural network (CNN), a deep CNN, vector quantization (VQ), dynamic time warping (DTW), a hidden Markov model, and/or another ML and/or AI based model, algorithm, and/or process. In some embodiments, to identify and/or redact sensitive data from one or more portions of the data associated with fresh food chamber 122 and/or freezer chamber 124, tensor processing unit 412 can implement the image recognition process and/or one or more of the ML and/or AI models, algorithms, and/or processes (e.g., CNN, R-CNN, DBN, DNN) described above with reference to the example embodiments illustrated in FIGS. 1, 2, and 3.

In some embodiments, to identify and/or redact sensitive data from one or more portions of the data associated with fresh food chamber 122 and/or freezer chamber 124, tensor processing unit 412 can implement one or more object detection ML and/or AI models, algorithms, and/or processes that are based on and/or utilize CNN network(s). For example, in these embodiments, to identify and/or redact sensitive data from one or more portions of the data associated with fresh food chamber 122 and/or freezer chamber 124, tensor processing unit 412 can implement one or more you only look once (YOLO) models and/or one or more you only learn one representation (YOLOR) models. For instance, in one embodiment, to identify and/or redact sensitive data from one or more portions of the data associated with fresh food chamber 122 and/or freezer chamber 124, tensor processing unit 412 can implement a YOLOv3 model, a YOLOv7 model, a YOLOv7-tiny model, a YOLOR model, and/or another YOLO or YOLOR model.

In the above-described embodiments, such one or more ML and/or AI models can be adapted and/or trained such that the model(s) are configured and/or operable to ingest (e.g., receive as input) the data (e.g., image(s), video, audio) associated with fresh food chamber 122 and/or freezer chamber 124 and to determine whether such data includes any sensitive data or information corresponding to, for instance, a user (e.g., a human operator, owner) associated with refrigerator appliance 100. In these embodiments, such ML and/or AI model(s) can be trained using one or more publicly available datasets that are designed and/or used to train such models to detect and/or redact sensitive data in images, video (e.g., video frames), and/or audio. Additionally, or alternatively, in these embodiments, such ML and/or AI model(s) can be trained using a dataset that is specific to a user (e.g., human owner, operator) of refrigerator appliance 100. For example, in these embodiments, such ML and/or AI model(s) can be trained using images, video (e.g., video frames), and/or audio that can include data indicative of such a user associated with refrigerator appliance 100 (e.g., images of the user, audio of the user's voice). In these embodiments, based at least in part on completion of such training, the ML and/or AI model(s) can be implemented by tensor processing unit 412 to identify and/or redact sensitive data associated with the user from one or more portions of the data associated with fresh food chamber 122 and/or freezer chamber 124.

In at least one embodiment, to identify and/or redact sensitive data from one or more portions of the data associated with fresh food chamber 122 and/or freezer chamber 124, tensor processing unit 412 can implement one or more ML and/or AI models and/or algorithms (e.g., one or more of the above-described ML and/or AI models) that can continuously (e.g., constantly, without interruption, in real-time, live) analyze overlapping samples of the data associated with fresh food chamber 122 and/or freezer chamber 124. In another embodiment, tensor processing unit 412 can implement one or more ML and/or AI models and/or algorithms (e.g., one or more of the above-described ML and/or AI models) that can be periodically called to analyze the data associated with fresh food chamber 122 and/or freezer chamber 124 (e.g., to analyze one or more samples of image data, video data, audio data). For instance, in this and/or another embodiment, tensor processing unit 412 can periodically call such ML and/or AI model(s) and/or algorithm(s) from memory element 406, a library (e.g., a database), and/or an application programming interface (API). In some embodiments, tensor processing unit 412 can periodically call such ML and/or AI model(s) and/or algorithm(s) to analyze the data associated with fresh food chamber 122 and/or freezer chamber 124 at intervals of, for example, every 0.1 second, 0.5 second, 1 second, 2 seconds, or another interval of time. In these and/or other embodiments, a sample size of the data to be input to and analyzed by the ML and/or AI model(s) and/or algorithm(s) can correspond to, be correlated with, and/or be proportional to the time interval used to call such model(s) and/or algorithm(s) such that the sample size is dictated by (e.g., dependent on) the time interval.

In the example embodiment depicted in FIG. 4, based at least in part on (e.g., in response to) capturing the data associated with fresh food chamber 122 and/or freezer chamber 124 (e.g., using camera 192) and/or redacting the above-described sensitive data (e.g., using tensor processing unit 412 and the ML and/or AI model(s) described above), camera module 402 can be configured and/or operable to store and/or transmit one or more versions and/or formats of such data. For example, in this and/or another embodiment, camera module 402 can be configured and/or operable to store and/or transmit: an original version (e.g., an unredacted, unedited, raw data version) of the data associated with fresh food chamber 122 and/or freezer chamber 124; a compressed version of such an original version of the data associated with fresh food chamber 122 and/or freezer chamber 124; a redacted version of the data associated with fresh food chamber 122 and/or freezer chamber 124; and/or a compressed version of such a redacted version of the data associated with fresh food chamber 122 and/or freezer chamber 124.

In the example embodiment depicted in FIG. 4, camera module 402 can be configured and/or operable to store the above-described version(s) and/or format(s) of the data associated with fresh food chamber 122 and/or freezer chamber 124 on, for instance, memory element 406. In this and/or another embodiment, camera module 402 can be configured and/or operable to transmit the above-described version(s) and/or format(s) of the data associated with fresh food chamber 122 and/or freezer chamber 124 to, for instance, controller 156 using communication system 408, signal 416, power supply line 418, external communication system 170, and/or network 174.

In the example embodiment depicted in FIG. 4, memory element 406 can constitute, include, be coupled to, and/or otherwise be associated with one or more memory elements such as, for instance, non-transitory storage media, non-transitory computer-readable storage media, electrically erasable programmable read only memory (EEPROM), and/or another memory element. In this and/or another embodiment, memory element 406 can store information, instructions (e.g., software), and/or data that can be accessed and/or implemented (e.g., executed) by one or more components of camera module 402 such as, for instance, image signal processor 404, communication system 408, tensor processing unit 412, and/or acceleration hardware 414.

In the example embodiment depicted in FIG. 4, memory element 406 can be configured and/or operable to store (e.g., in a rolling buffer of memory element 406) the above-described version(s) and/or format(s) of the data associated with fresh food chamber 122 and/or freezer chamber 124 that can be captured when refrigerator door 128 and/or freezer door 130, respectively, is in an open position as described above. In this and/or another embodiment, memory element 406 can also store one or more of the above-described ML and/or AI model(s) and/or algorithm(s) (e.g., audio or image-based data detection and/or sensitive data detection model(s) and/or algorithm(s)) that can be implemented by tensor processing unit 412 to perform one or more operations in accordance with example embodiments of the present disclosure. In this and/or another embodiment, memory element 406 can further store instructions (e.g., software, computer-readable code, processing threads), data, and/or information corresponding to such ML and/or AI model(s) and/or algorithm(s) that can be used by tensor processing unit 412 to implement such ML and/or AI model(s) and/or algorithm(s) according to one or more embodiments described herein.

In the example embodiment depicted in FIG. 4, camera module 402 can be configured and/or operable to compress the above-described data associated with fresh food chamber 122 and/or freezer chamber 124 that can be captured by camera 192 when refrigerator door 128 and/or freezer door 130, respectively, is in an open position as described above. Additionally, or alternatively, in this and/or another embodiment, camera module 402 can be configured and/or operable to compress a redacted version (e.g., provided by tensor processing unit 412) of the data associated with fresh food chamber 122 and/or freezer chamber 124 that can be captured by camera 192 when refrigerator door 128 and/or freezer door 130, respectively, is in an open position as described above.

In the example embodiment depicted in FIG. 4, acceleration hardware 414 can be configured and/or operable to compress data such as, for instance, image data (e.g., images), video data (e.g., video, video frames), and/or audio data (e.g., audio). In this and/or another embodiment, camera module 402 can employ acceleration hardware 414 to compress the above-described data associated with fresh food chamber 122 and/or freezer chamber 124 that can be captured by camera 192 when refrigerator door 128 and/or freezer door 130, respectively, is in an open position as described above. Additionally, or alternatively, in this and/or another embodiment, camera module 402 can employ acceleration hardware 414 to compress a redacted version (e.g., provided by tensor processing unit 412) of the data associated with fresh food chamber 122 and/or freezer chamber 124 that can be captured by camera 192 when refrigerator door 128 and/or freezer door 130, respectively, is in an open position as described above.

In the example embodiment depicted in FIG. 4, acceleration hardware 414 can compress the above-described data associated with fresh food chamber 122 and/or freezer chamber 124 and/or a redacted version of such data (e.g., provided by tensor processing unit 412) to a compressed format. For instance, in this and/or another embodiment, acceleration hardware 414 can compress such data associated with fresh food chamber 122 and/or freezer chamber 124 and/or a redacted version of such data (e.g., provided by tensor processing unit 412) to a compressed format such as, for example: a joint photographic experts group (JPEG or JPG) format; an advanced video coding (AVC, also referred to as H.264) format; a high efficiency video coding (HEVC, also referred to as H.265) format; and/or another compressed format.

In the example embodiment depicted in FIG. 4, camera module 402 can be configured and/or operable to store a compressed version (e.g., a JPG file, H.264 file, H.265 file) of the above-described data associated with fresh food chamber 122 and/or freezer chamber 124 that can be captured by camera 192 when refrigerator door 128 and/or freezer door 130, respectively, is in an open position. Additionally, or alternatively, in this and/or another embodiment, camera module 402 can be configured and/or operable to store a compressed version (e.g., a JPG file, H.264 file, H.265 file) of a redacted version (e.g., provided by tensor processing unit 412) of the above-described data associated with fresh food chamber 122 and/or freezer chamber 124 that can be captured by camera 192 when refrigerator door 128 and/or freezer door 130, respectively, is in an open position.

In the example embodiment depicted in FIG. 4, camera module 402 can employ image signal processor 404, memory element 406, tensor processing unit 412, and/or acceleration hardware 414 to store a compressed version (e.g., a JPG file, H.264 file, H.265 file) of the above-described data associated with fresh food chamber 122 and/or freezer chamber 124 on memory element 406. Additionally, or alternatively, in this and/or another embodiment, camera module 402 can employ image signal processor 404, memory element 406, tensor processing unit 412, and/or acceleration hardware 414 to store a compressed version (e.g., a JPG file, H.264 file, H.265 file) of a redacted version (e.g., provided by tensor processing unit 412) of the data associated with fresh food chamber 122 and/or freezer chamber 124 on memory element 406.

In the example embodiment depicted in FIG. 4, communication system 408 can be configured and/or operable to communicate with controller 156 (e.g., by way of signal 416, power supply line 418, external communication system 170, network 174). For example, in this and/or another embodiment, communication system 408 can be configured and/or operable to facilitate interaction, data transfer, and/or other communications between camera module 402 and controller 156 (e.g., via signal 416, power supply line 418, external communication system 170, network 174). In this and/or another embodiment, such communication can be used to provide and receive, for instance: various types of data in various types of formats (e.g., data signals, media, images, video, audio, multiplexed or demultiplexed data signals); operating instructions (e.g., operating commands); operating parameters; user instructions or notifications; performance characteristics; user preferences; and/or any other data or information.

In the example embodiment depicted in FIG. 4, communication between camera module 402 (e.g., via communication system 408) and controller 156 (e.g., via external communication system 170) can be carried using any type of wired connection (e.g., power supply line 418) or wireless connection (e.g., signal 416) and using any suitable type of communication network (e.g., Bluetooth® Low Energy (BLE), network 174), non-limiting examples of which are provided below. In this and/or another embodiment, camera module 402 (e.g., via communication system 408) can be in direct or indirect communication with controller 156 (e.g., via external communication system 170) through any suitable wired or wireless communication connections or interfaces such as, for example, signal 416. In this and/or another embodiment, signal 416 can be associated with and/or facilitated by a short-range or long-range wireless network (e.g., LAN, WAN, PAN, the Internet, a cellular network). In this and/or another embodiment, communications can be transmitted using any suitable communications devices or protocols such as, for example, via Wi-Fi®, Bluetooth®, Zigbee®, wireless radio, laser, infrared, Ethernet type devices and interfaces, and/or another device or protocol. In this and/or another embodiment, such communication can use a variety of: communication protocols (e.g., transmission control protocol/internet protocol (TCP/IP), hypertext transfer protocol (HTTP), simple mail transfer protocol (SMTP), file transfer protocol (FTP)); encodings or formats (e.g., hypertext markup language (HTML), extensible markup language (XML)); and/or protection schemes (e.g., virtual private network (VPN), secure HTTP, secure shell (SSH), secure sockets layer (SSL)).

In the example embodiment depicted in FIG. 4, camera module 402 can be configured and/or operable to transmit the above-described version(s) and/or format(s) of the data associated with fresh food chamber 122 and/or freezer chamber 124 that can be captured by camera 192 when refrigerator door 128 and/or freezer door 130, respectively, is in an open position as described above. For example, in this and/or another embodiment, camera module 402 can use communication system 408 to transmit such version(s) and/or format(s) of the data associated with fresh food chamber 122 and/or freezer chamber 124 to controller 156 by way of signal 416 and/or external communication system 170.

In some embodiments, camera module 402 can use communication system 408 to transmit the above-described original version and/or compressed version (e.g., a JPG file, H.264 file, H.265 file) of such data associated with fresh food chamber 122 and/or freezer chamber 124 to controller 156 by way of signal 416 and/or external communication system 170. In some embodiments, camera module 402 can use communication system 408 to transmit the above-described redacted version and/or compressed version (e.g., a JPG file, H.264 file, H.265 file) of the redacted version of such data associated with fresh food chamber 122 and/or freezer chamber 124 to controller 156 by way of signal 416 and/or external communication system 170.

In some embodiments, camera module 402 can be configured and/or operable to transmit one or more of the above-described versions and/or formats of the data associated with fresh food chamber 122 and/or freezer chamber 124 to controller 156 based at least in part on (e.g., in response to receiving) a request from controller 156 to transmit such data. For example, in these embodiments, in response to receiving such a request from controller 156, camera module 402 can send controller 156: the original version of the data associated with fresh food chamber 122 and/or freezer chamber 124 that can be captured by camera 192 when refrigerator door 128 and/or freezer door 130 is in an open position; the compressed version (e.g., a JPG file, H.264 file, H.265 file) of such data; the redacted version of such data; and/or the compressed version (e.g., a JPG file, H.264 file, H.265 file) of the redacted version of such data.

In an alternative and/or additional embodiment, camera module 402 can be configured and/or operable to transmit one or more of the above-described versions and/or formats (e.g., original, compressed, redacted, compressed-redacted) of the data associated with fresh food chamber 122 and/or freezer chamber 124 to controller 156 as such data is being captured and/or processed by camera module 402 (e.g., live, in real-time). For example, in this and/or another embodiment, camera module 402 can be configured and/or operable to transmit one or more of the above-described versions and/or formats of the data associated with fresh food chamber 122 and/or freezer chamber 124 to controller 156: while refrigerator door 128 and/or freezer door 130 is in an open position; while camera 192 is capturing such data; immediately after tensor processing unit 412 generates the redacted version of such data; and/or immediately after acceleration hardware 414 compresses the original version of such data and/or the redacted version of such data.

In the example embodiment depicted in FIG. 4, camera module 402 can be configured and/or operable to transmit one or more of the above-described versions and/or formats (e.g., original, compressed, redacted, compressed-redacted) of the data associated with fresh food chamber 122 and/or freezer chamber 124 to controller 156 based at least in part on (e.g., in response to) completion of the above-described authentication process that can be performed by controller 156 and camera module 402 to verify the identity of controller 156 and camera module 402 and establish a secure, trusted relationship. For example, in this and/or another embodiment, camera module 402 can be configured and/or operable to transmit a redacted version of the data associated with fresh food chamber 122 and/or freezer chamber 124 to controller 156 after controller 156 and camera module 402 have completed the above-described authentication process to verify the identity of controller 156 and camera module 402 and establish a secure, trusted relationship. In another embodiment, camera module 402 can be configured and/or operable to send controller 156 a compressed version of a redacted version of the data associated with fresh food chamber 122 and/or freezer chamber 124 after controller 156 and camera module 402 have completed the above-described authentication process to verify the identity of controller 156 and camera module 402 and establish a secure, trusted relationship.

In the example embodiment depicted in FIG. 4, camera module 402 can be configured and/or operable to encrypt one or more of the above-described versions and/or formats (e.g., original, compressed, redacted, compressed-redacted) of the data associated with fresh food chamber 122 and/or freezer chamber 124 that can be captured by camera 192 while refrigerator door 128 and/or freezer door 130 is in an open position. For example, some embodiments, camera module 402 can include, be coupled to, and/or otherwise be associated with encryption hardware and/or software that camera module 402 (e.g., via image signal processor 404, communication system 408, tensor processing unit 412) can utilize to encrypt one or more of the above-described versions and/or formats of the data associated with fresh food chamber 122 and/or freezer chamber 124. In at least one embodiment, camera module 402 can encrypt such data before transmitting it to controller 156.

In the example embodiment depicted in FIG. 4, camera module 402 can encrypt one or more of the above-described versions and/or formats (e.g., original, compressed, redacted, compressed-redacted) of the data associated with fresh food chamber 122 and/or freezer chamber 124 based at least in part on (e.g., in response to) completion of the above-described authentication process that can be performed by controller 156 and camera module 402 to verify the identity of controller 156 and camera module 402 and establish a secure, trusted relationship. For example, in this and/or another embodiment, after controller 156 and camera module 402 have completed the above-described authentication process, camera module 402 can encrypt any and/or all of the above-described versions and/or formats (e.g., original, compressed, redacted, compressed-redacted) of the data associated with fresh food chamber 122 and/or freezer chamber 124 that can be captured by camera 192 while refrigerator door 128 and/or freezer door 130 is in an open position. In at least one embodiment, camera module 402 can encrypt such data before transmitting it to controller 156.

In at least one embodiment, controller 156 can be configured and/or operable to decrypt one or more of the above-described versions and/or formats (e.g., original, compressed, redacted, compressed-redacted) of the data associated with fresh food chamber 122 and/or freezer chamber 124 that can be captured by camera 192 while refrigerator door 128 and/or freezer door 130 is in an open position. For example, some embodiments, controller 156 can include, be coupled to, and/or otherwise be associated with decryption hardware and/or software that controller 156 can utilize to decrypt one or more of the above-described versions and/or formats of the data associated with fresh food chamber 122 and/or freezer chamber 124 that can be transmitted to controller 156 by camera module 402.

In some embodiments, controller 156 can be configured and/or operable to perform a machine learning image recognition process to analyze one or more of the above-described versions and/or formats of the data associated with fresh food chamber 122 and/or freezer chamber 124 that can be captured by camera 192 when refrigerator door 128 and/or freezer door 130, respectively, is in an open position as described above. For example, in these embodiments, upon receiving such version(s) and/or format(s) of such data (e.g., original data, compressed data, redacted data, compressed-redacted data), controller 156 can use such data to implement the machine learning image recognition process described above with reference to the example embodiments illustrated in FIGS. 1, 2, and 3 to determine whether one or more objects 182 (e.g., food items, beverages) have been inserted into, re-positioned in, and/or removed from fresh food chamber 122 and/or freezer chamber 124 when refrigerator door 128 and/or freezer door 130, respectively, was in an open position.

In the example embodiment depicted in FIG. 4, external communication system 170 can be configured and/or operable to communicate with one or more remote computing devices that can be external to (e.g., remote, separate from) refrigerator appliance 100 as described above with reference to the example embodiments illustrated in FIGS. 1, 2, and 3. For instance, as illustrated in the embodiment depicted in FIG. 4, external communication system 170 can communicate with external device 172 and/or remote server 176 by way of network 174 as described above with reference to the example embodiments illustrated in FIGS. 1, 2, and 3.

In some embodiments, controller 156 can be configured to provide (e.g., transmit), to one or more remote computing devices, the above-described version(s) and/or format(s) of the data associated with fresh food chamber 122 and/or freezer chamber 124 that can be captured by camera 192 when refrigerator door 128 and/or freezer door 130, respectively, is in an open position. For example, in these embodiments, controller 156 can be configured to provide (e.g., transmit) such version(s) and/or format(s) of such data (e.g., original data, compressed data, redacted data, compressed-redacted data) to external device 172 and/or remote server 176 by way of network 174 using external communication system 170 as described above with reference to the example embodiments illustrated in FIGS. 1, 2, and 3. In these embodiments, upon receiving such version(s) and/or format(s) of such data, external device 172 and/or remote server 176 can analyze such data as described above with reference to the example embodiments illustrated in FIGS. 1, 2, and 3 to determine whether one or more objects 182 (e.g., food items, beverages) have been inserted into, re-positioned in, and/or removed from fresh food chamber 122 and/or freezer chamber 124 when refrigerator door 128 and/or freezer door 130, respectively, was in an open position.

Figure 5:
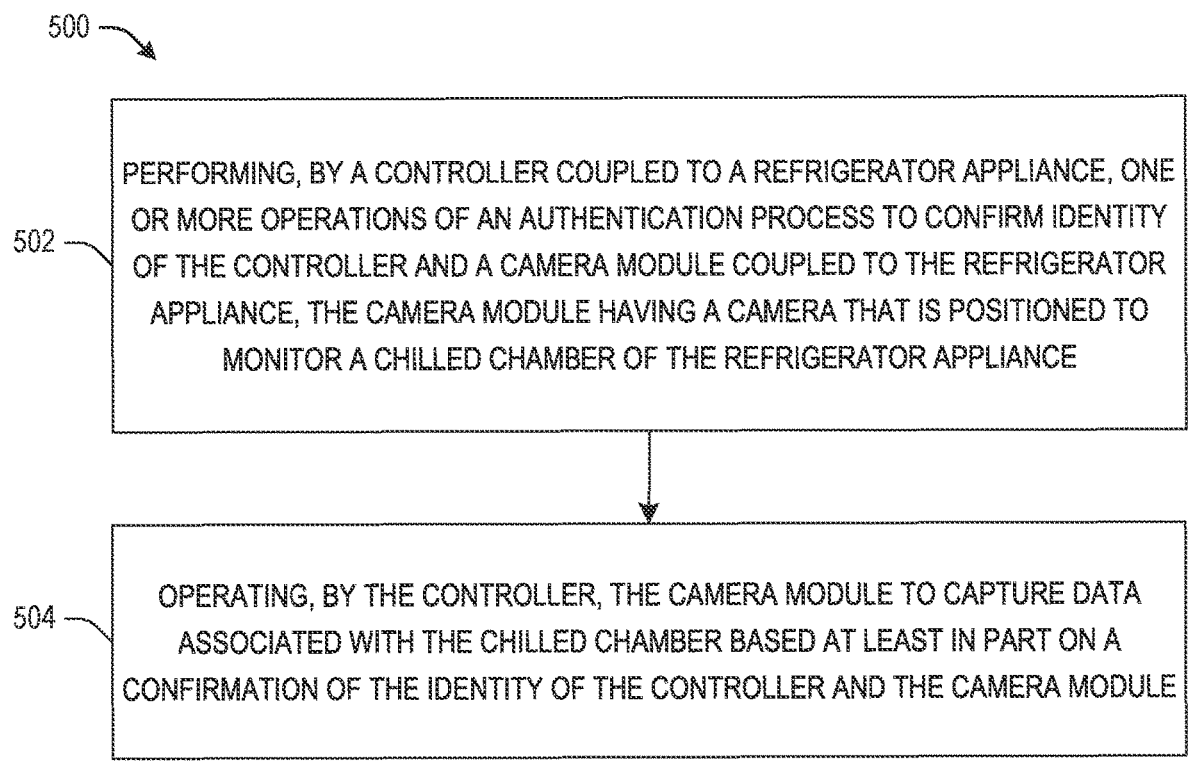
FIG. 5 illustrates a flow diagram of an example, non-limiting method to operate the example inventory management system of FIGS. 2, 3, and/or 4 according to one or more example embodiments of the present disclosure.

FIG. 5 illustrates a flow diagram of an example, non-limiting method 500 to operate inventory management system 180 described above and illustrated in FIGS. 2, 3, and/or 4 according to one or more example embodiments of the present disclosure. Method 500 may be implemented using, for instance, controller 156, inventory management system 180 (e.g., the embodiments of inventory management system 180 described above and illustrated in FIGS. 2, 3, and/or 4), camera assembly 190 (e.g., the embodiments of camera assembly 190 described above and illustrated in FIGS. 2, 3, and/or 4), and/or camera module(s) 402. In some embodiments, method 500 can constitute an example method to implement inventory management within a refrigerator appliance (e.g., refrigerator appliance 100), where the refrigerator appliance can include a chilled chamber (e.g., fresh food chamber 122, freezer chamber 124), a controller (e.g., controller 156), and a camera assembly (e.g., camera assembly 190) having a camera module (e.g., camera module(s) 402) that includes and/or is coupled to a camera (e.g., camera 192) positioned to monitor the chilled chamber.

The example embodiment illustrated in FIG. 5 depicts operations performed in a particular order for purposes of illustration and discussion. Those of ordinary skill in the art, using the disclosures provided herein, will understand that various operations or steps of method 500 or any of the other methods disclosed herein may be adapted, modified, rearranged, performed simultaneously, include operations not illustrated, and/or modified in various ways without deviating from the scope of the present disclosure.

At 502, method 500 can include performing, by a controller (e.g., controller 156) coupled to a refrigerator appliance (e.g., refrigerator appliance 100), one or more operations of an authentication process to confirm identity of the controller and a camera module (e.g., camera module 402) coupled to the refrigerator appliance, the camera module having a camera (e.g., camera 192) that is positioned to monitor a chilled chamber (e.g., fresh food chamber 122 and/or freezer chamber 124) of the refrigerator appliance.

At 504, method 500 can include operating, by the controller, the camera module to capture data (e.g., image(s), video, audio) associated with the chilled chamber (e.g., images(s), video, and/or audio captured inside fresh food chamber 122 and/or freezer chamber 124) based at least in part on a confirmation of the identity of the controller and the camera module.

Example embodiments described in the present disclosure provide several technical benefits and/or advantages. For example, the present disclosure provides an improved camera control and security scheme for a master control unit (MCU) of a refrigerator appliance (e.g., a single board computer (SBC), a controller) that is tasked with providing functionality to an inventory management system that monitors the inventory of such an appliance. For instance, such an improved control and security scheme allows the MCU to: establish a trusted, secure relationship (e.g., secure connection) with the inventory management system and/or one or more components thereof (e.g., camera modules, cameras); redact sensitive data captured by one or more cameras of the inventory management system when a door coupled to a chilled chamber of the refrigerator appliance is open; and/or concentrate its limited resources on capturing data (e.g., images, video, audio) when the door coupled to the chilled chamber is open.

In at least one example embodiment of the present disclosure, a controller (e.g., SBC, MCU) of the refrigerator appliance that provides functionality to an inventory management system of the refrigerator appliance can perform an authentication process with a camera module of the inventory management system to verify the identity of the controller and the camera module to establish a trusted, secure relationship (e.g., secure connection) between the controller and the camera module. In this embodiment, after such authentication process is complete, the camera module can transmit data (e.g., images, video, audio) to the controller in a secure manner (e.g., encrypted) to prevent interception of such data and/or to prevent such data from being compromised by an unintended entity (e.g., a person or device not associated with the refrigerator appliance).

In another embodiment, the camera control and security scheme of the present disclosure can allow for the camera module to redact sensitive data (e.g., data that can be used to identify a user of the refrigerator appliance) captured by the camera while a door of the refrigerator appliance is open. In this embodiment, the camera control and security scheme of the present disclosure can thereby prevent sensitive data associated with a user of the refrigerator appliance from being intercepted by an unintended entity (e.g., a person or device not associated with the refrigerator appliance).

In at least one example embodiment described herein, camera module(s) of an inventory management system can operate in a relatively low power consumption mode to capture images, video, and/or audio inside a chilled chamber of a refrigerator appliance while a door coupled to the chilled chamber is in a closed position. In this embodiment, the camera module(s) can operate in a relatively normal and/or standard power consumption mode while the door is in an open position to capture images, video, and/or audio of contents in the chilled chamber. In this embodiment, by implementing such a power control scheme described above, a controller (e.g., SBC, MCU) of the refrigerator appliance that provides functionality to an inventory management system of the refrigerator appliance can thereby reduce the energy and/or operating costs associated with the inventory management system. For example, in this embodiment, implementing such a power control scheme can reduce the data processing costs, data storage costs, and/or data communication costs associated with operating the inventory management system to monitor the inventory of the refrigerator appliance.

In the embodiments described above, by preventing interception of data transferred between the controller and the camera module, the camera control and security scheme of the present disclosure can thereby improve the performance, capacity, and/or efficiency, as well as reduce operational costs associated with the refrigerator appliance and/or one or more components thereof. For example, the camera control and security scheme of the present disclosure can improve the performance, capacity, and/or efficiency, as well as reduce operational costs (e.g., processing, storage, communication) of the controller, the camera module, one or more memory elements, and/or one or more communication systems coupled to and/or included with the refrigerator appliance.

In another example embodiment, by using short range wireless communication systems and/or protocols (e.g., BLE) to transfer data (e.g., images, video, audio, control commands) between the controller and the camera module, the camera control and security scheme of the present disclosure can reduce and/or eliminate one or more components of the inventory management system that is tasked with monitoring the chilled chamber(s) of the refrigerator appliance. In this embodiment, the reduction and/or elimination of such component(s) can reduce the complexity associated with the design, manufacturing, and/or assembly of such a refrigerator appliance having such an inventory management system. Additionally, in this embodiment, the reduction and/or elimination of such component(s) can also provide increased flexibility (e.g., more options) associated with the design, manufacturing, and/or assembly of the refrigerator appliance and/or inventory management system. Further, in this embodiment, the reduction and/or elimination of such component(s) can reduce the costs associated with the design, manufacturing, and/or assembly of the refrigerator appliance and/or inventory management system.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance comprising:
a cabinet defining a chilled chamber;
a controller coupled to the refrigerator appliance and configured to operate one or more components of the refrigerator appliance; and
a camera assembly coupled to the cabinet and configured to monitor the chilled chamber, the camera assembly comprising a camera module having a camera that is configured to capture data associated with the chilled chamber,
wherein the controller and the camera module are each configured to respectively perform one or more operations of an authentication process to verify identity of the controller and the camera module, wherein the authentication process comprises operating the camera to capture an image of an interior portion of the chilled chamber, the image comprising a defined feature of the interior portion of the chilled chamber, the defined feature being indicative of a location of the camera with respect to at least one of the chilled chamber, the interior portion of the chilled chamber, or the defined feature, and
wherein the camera module is configured to operate the camera to capture the data associated with the chilled chamber based at least in part on verification of the identity of the controller and the camera module.

2. The refrigerator appliance of claim 1, wherein the controller and the camera module are each configured to perform the authentication process during a power up process associated with at least one of the refrigerator appliance, the chilled chamber, the controller, the camera assembly, the camera module, or the camera.

3. The refrigerator appliance of claim 1, wherein the controller is configured to perform the one or more operations of the authentication process by:
cycling an interior light of the chilled chamber on and off, and wherein cycling the interior light on and off is indicative of the identity of the controller.

4. The refrigerator appliance of claim 1, wherein the controller is configured to perform the one or more operations of the authentication process by:
cycling an interior light of the chilled chamber on and off such that the interior light outputs a defined illumination level when cycled on, the defined illumination level being indicative of the identity of the controller.

5. The refrigerator appliance of claim 1, wherein the camera module is configured to perform the one or more operations of the authentication process by:
operating the camera to detect a defined illumination level of an interior light of the chilled chamber while the interior light is being cycled on and off by the controller, the defined illumination level being indicative of the identity of the controller.

6. The refrigerator appliance of claim 1, wherein the camera module is configured to perform the one or more operations of the authentication process by:
transmitting a signal to the controller based at least in part on detection by the camera module of a defined illumination level of an interior light of the chilled chamber while the interior light is being cycled on and off by the controller, the signal being indicative of the identity of the camera module.

7. The refrigerator appliance of claim 1, wherein the controller is configured to perform the one or more operations of the authentication process by:
cycling a power supply of the camera module on and off, and wherein cycling the power supply on and off is indicative of the identity of the controller.

8. The refrigerator appliance of claim 1, wherein the controller is configured to perform the one or more operations of the authentication process by:
comparing an image template of an interior portion of the chilled chamber with an image of the interior portion of the chilled chamber captured by the camera; and
determining whether the image captured by the camera matches the image template, and wherein a determination that the image captured by the camera matches the image template is indicative of the identity of the camera module.

9. The refrigerator appliance of claim 8, wherein determining whether the image captured by the camera matches the image template comprises:
determining whether a defined feature is positioned at a defined location in each of the image template and the image captured by the camera.

10. The refrigerator appliance of claim 1, wherein the camera module comprises a tensor processing unit configured to implement a sensitive data detection model to identify and redact sensitive data from one or more portions of the data associated with the chilled chamber.

11. A method of implementing inventory management within a refrigerator appliance, the refrigerator appliance comprising a chilled chamber, a controller, and a camera assembly comprising a camera module having a camera that is positioned to monitor the chilled chamber, the method comprising:
performing, by the controller, one or more operations of an authentication process to confirm identity of the controller and the camera module, wherein performing, by the controller, the one or more operations of the authentication process comprises cycling, by the controller, an interior light of the chilled chamber on and off, and wherein cycling, by the controller, the interior light on and off is indicative of the identity of the controller; and
operating, by the controller, the camera module to capture data associated with the chilled chamber based at least in part on a confirmation of the identity of the controller and the camera module.

12. The method of claim 11, wherein performing, by the controller, the one or more operations of the authentication process comprises:
cycling, by the controller, an interior light of the chilled chamber on and off such that the interior light outputs a defined illumination level when cycled on, the defined illumination level being indicative of the identity of the controller.

13. The method of claim 11, wherein performing, by the controller, the one or more operations of the authentication process comprises:
processing, by the controller, a signal received from the camera module based at least in part on detection by the camera module of a defined illumination level of an interior light of the chilled chamber while the interior light is being cycled on and off by the controller, the signal being indicative of the identity of the camera module.

14. The method of claim 11, wherein performing, by the controller, the one or more operations of the authentication process comprises:
cycling, by the controller, a power supply of the camera module on and off, and wherein cycling, by the controller, the power supply on and off is indicative of the identity of the controller.

15. The method of claim 11, wherein performing, by the controller, the one or more operations of the authentication process comprises:
operating, by the controller, the camera module to use the camera to capture an image of an interior portion of the chilled chamber, the image comprising a defined feature of the interior portion of the chilled chamber, the defined feature being indicative of a location of the camera with respect to at least one of the chilled chamber, the interior portion of the chilled chamber, or the defined feature.

16. The method of claim 11, wherein performing, by the controller, the one or more operations of the authentication process comprises:
comparing, by the controller, an image template of an interior portion of the chilled chamber with an image of the interior portion of the chilled chamber captured by the camera; and
determining, by the controller, whether the image captured by the camera matches the image template, and wherein a determination that the image captured by the camera matches the image template is indicative of the identity of the camera module.

17. A refrigerator appliance comprising:
a cabinet defining a chilled chamber;
a controller coupled to the refrigerator appliance and configured to operate one or more components of the refrigerator appliance; and
a camera assembly coupled to the cabinet and configured to monitor the chilled chamber, the camera assembly comprising a camera module having a camera that is configured to capture data associated with the chilled chamber,
wherein the controller and the camera module are each configured to respectively perform one or more operations of an authentication process to verify identity of the controller and the camera module, wherein performing, by the controller, the one or more operations of the authentication process comprises cycling, by the controller, an interior light of the chilled chamber on and off such that the interior light outputs a defined illumination level when cycled on, the defined illumination level being indicative of the identity of the controller, and
wherein the camera module is configured to operate the camera to capture the data associated with the chilled chamber based at least in part on verification of the identity of the controller and the camera module.

18. The refrigerator appliance of claim 17, wherein the controller and the camera module are each configured to perform the authentication process during a power up process associated with at least one of the refrigerator appliance, the chilled chamber, the controller, the camera assembly, the camera module, or the camera.

19. The refrigerator appliance of claim 17, wherein the camera module comprises a tensor processing unit configured to implement a sensitive data detection model to identify and redact sensitive data from one or more portions of the data associated with the chilled chamber.

* * * * *